US011481080B2

(12) United States Patent
Kobayashi et al.

(10) Patent No.: US 11,481,080 B2
(45) Date of Patent: Oct. 25, 2022

(54) SENSOR DEVICE, INPUT DEVICE, AND ELECTRONIC APPARATUS

(71) Applicant: SONY GROUP CORPORATION, Tokyo (JP)

(72) Inventors: Ken Kobayashi, Tokyo (JP); Kei Tsukamoto, Tokyo (JP); Yoshiaki Sakakura, Tokyo (JP); Akira Ebisui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/419,991

(22) PCT Filed: Dec. 5, 2019

(86) PCT No.: PCT/JP2019/047580
§ 371 (c)(1),
(2) Date: Jun. 30, 2021

(87) PCT Pub. No.: WO2020/144984
PCT Pub. Date: Jul. 16, 2020

(65) Prior Publication Data
US 2022/0066598 A1   Mar. 3, 2022

(30) Foreign Application Priority Data

Jan. 11, 2019 (JP) .............................. JP2019-003526

(51) Int. Cl.
*G06F 3/044* (2006.01)
*G06F 3/041* (2006.01)

(52) U.S. Cl.
CPC .......... *G06F 3/0447* (2019.05); *G06F 3/0412* (2013.01); *G06F 3/0448* (2019.05); *G06F 3/04164* (2019.05); *G06F 2203/04102* (2013.01)

(58) Field of Classification Search
CPC .. G06F 3/0447; G06F 3/0412; G06F 3/04164; G06F 3/0448; G06F 2203/04102
See application file for complete search history.

(56) References Cited

U.S. PATENT DOCUMENTS 10,101,866 B2 * 10/2018 Kano .................... G01L 1/16
2012/0075243 A1 * 3/2012 Doi ..................... G06F 3/0447
345/174

(Continued)

FOREIGN PATENT DOCUMENTS

CN       107787476 A    3/2018
CN       110291373 A    9/2019
(Continued)

OTHER PUBLICATIONS

International Search Report and Written Opinion of PCT Application No. PCT/JP2019/047580, dated Jan. 7, 2020, 10 pages of ISRWO.

*Primary Examiner* — Jonathan A Boyd
(74) *Attorney, Agent, or Firm* — Chip Law Group

(57) ABSTRACT

A sensor device according to an embodiment of the present disclosure includes a plurality of detection electrode sections of a capacitive type, a reference electrode layer disposed at a position that faces each of the detection electrode sections, and a pressing transmission layer that causes locations, of the reference electrode layer, that face the respective detection electrode sections to be deformed locally in response to pressing performed from outside.

17 Claims, 20 Drawing Sheets

(56) References Cited

U.S. PATENT DOCUMENTS

| | | | |
|---|---|---|---|
| 2015/0185948 A1* | 7/2015 | Chang | G06F 3/0416 345/174 |
| 2016/0224182 A1* | 8/2016 | Kano | G06F 3/0487 |
| 2018/0188874 A1 | 7/2018 | Cho et al. | |

FOREIGN PATENT DOCUMENTS

| | | |
|---|---|---|
| EP | 3312706 A1 | 4/2018 |
| JP | 05-0288619 A | 11/1993 |
| KR | 10-2016-0149982 A | 12/2016 |
| KR | 10-2016-0150070 A | 12/2016 |
| WO | 2015/060280 A1 | 4/2015 |
| WO | 2016/143241 A1 | 9/2016 |
| WO | 2016/204568 A1 | 12/2016 |
| WO | 2018/151268 A1 | 8/2018 |
| WO | WO-2018151268 A1 * 8/2018 ............... B32B 7/12 |

* cited by examiner

[FIG. 1]
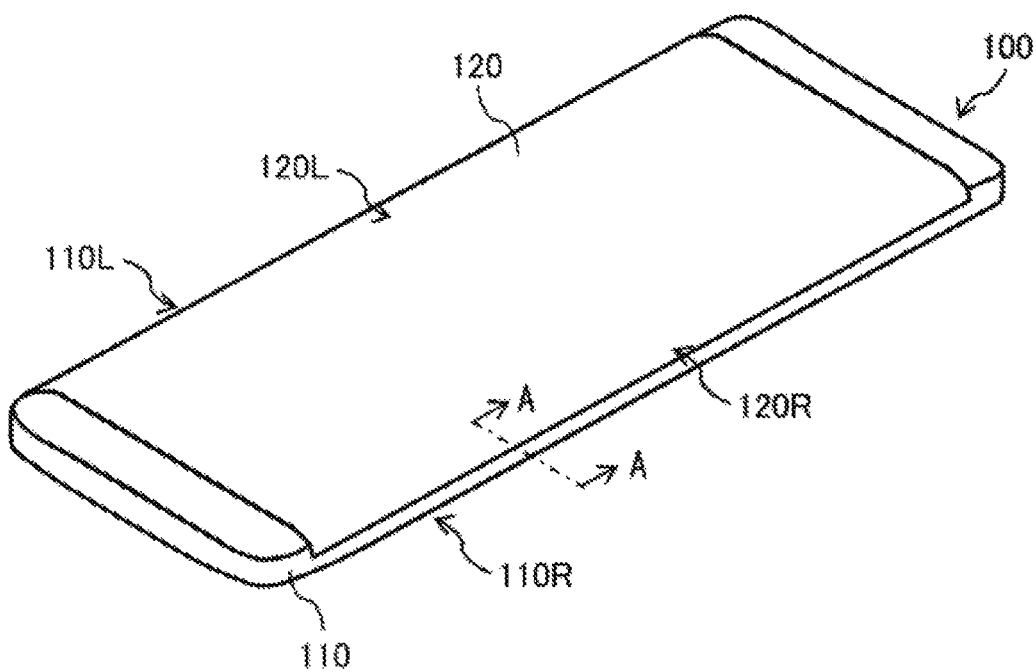
[FIG. 2]
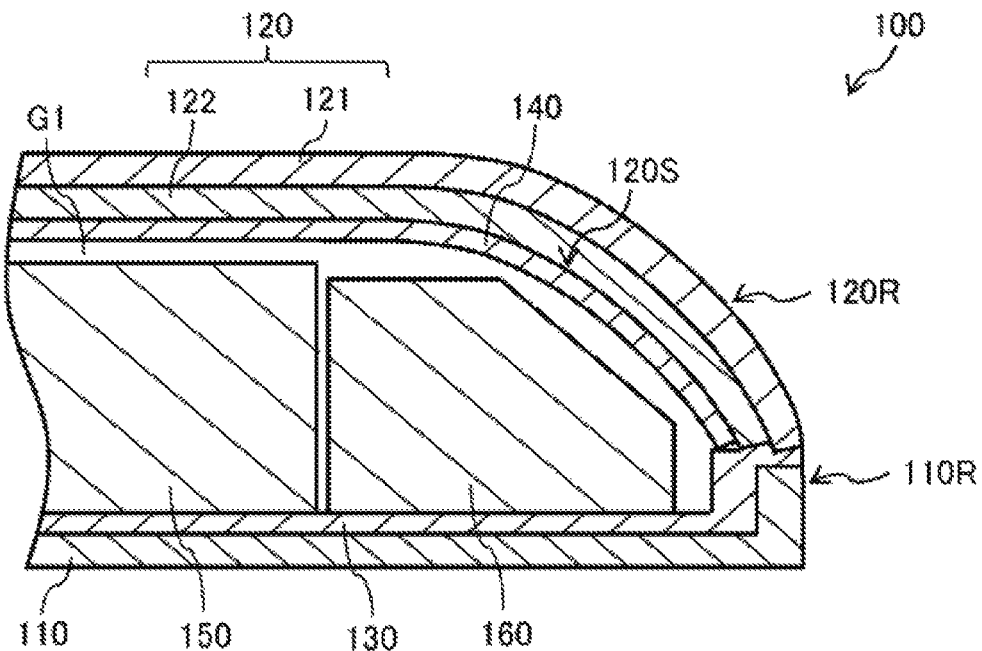

[FIG. 3]
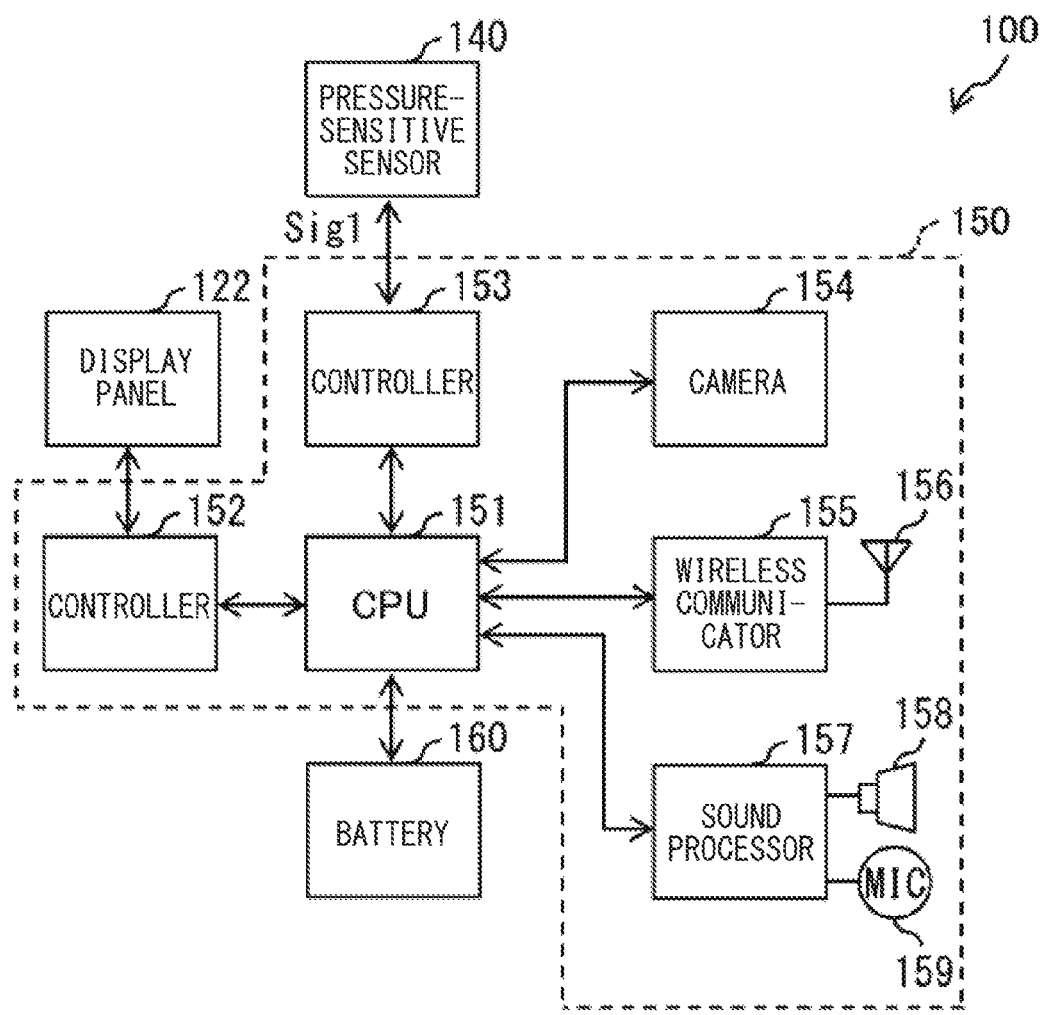

[FIG. 4]
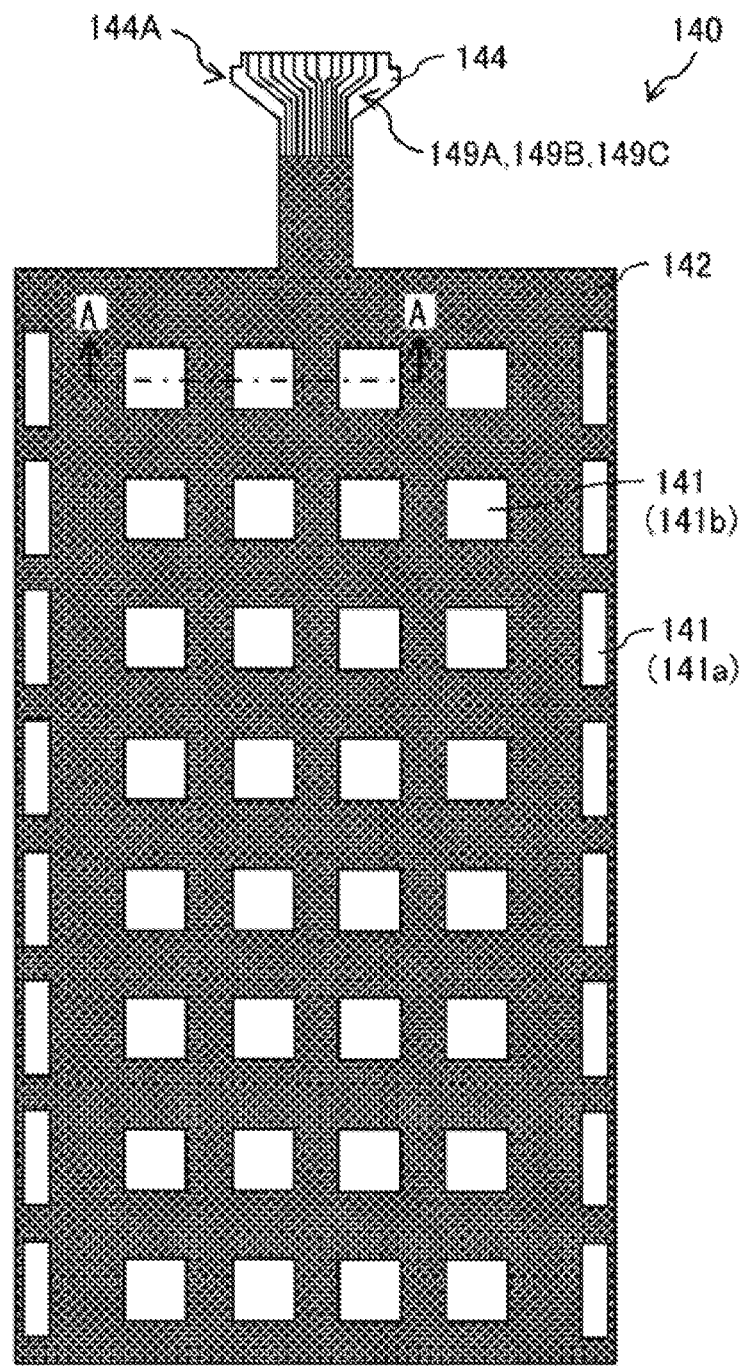

[FIG. 5]
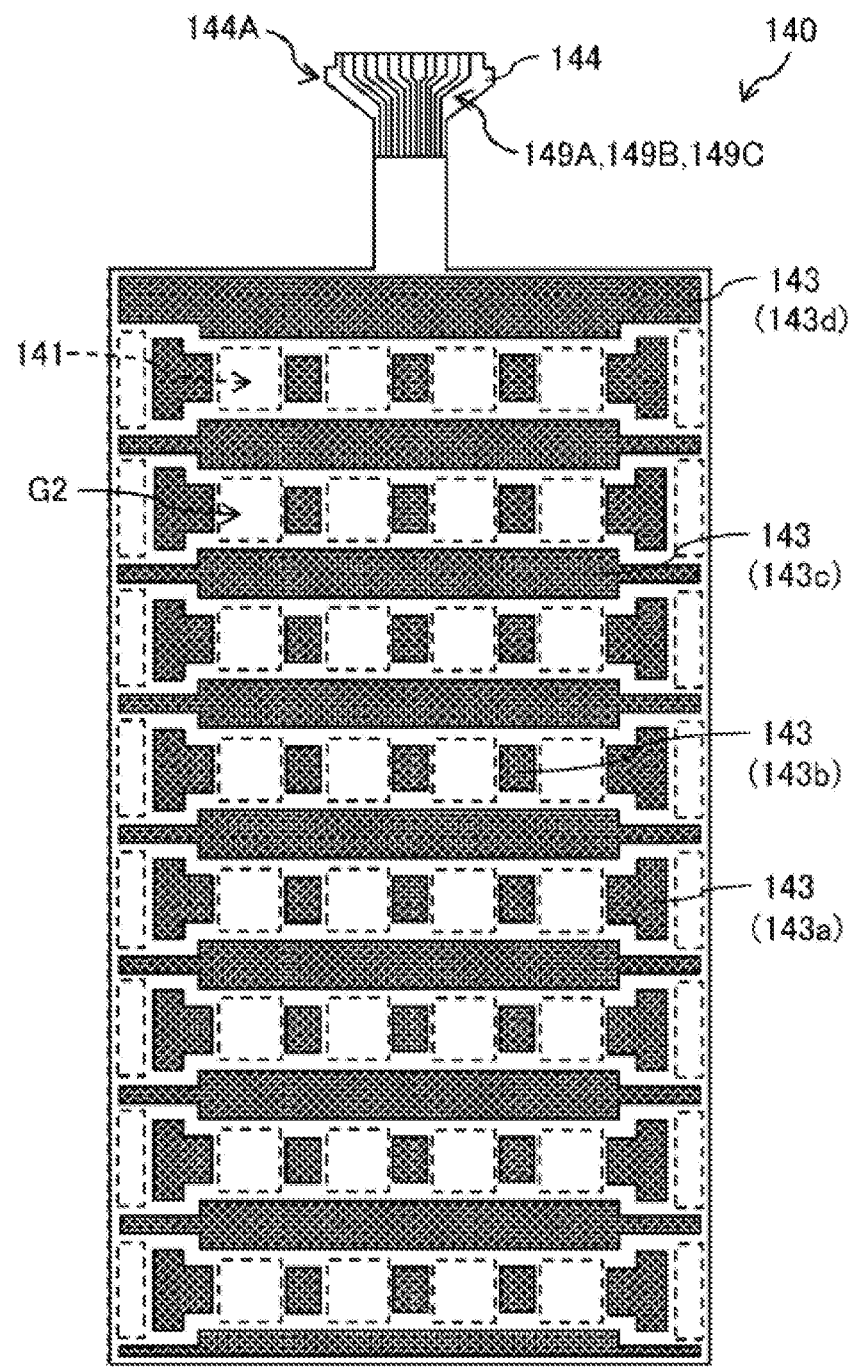

[FIG. 6]
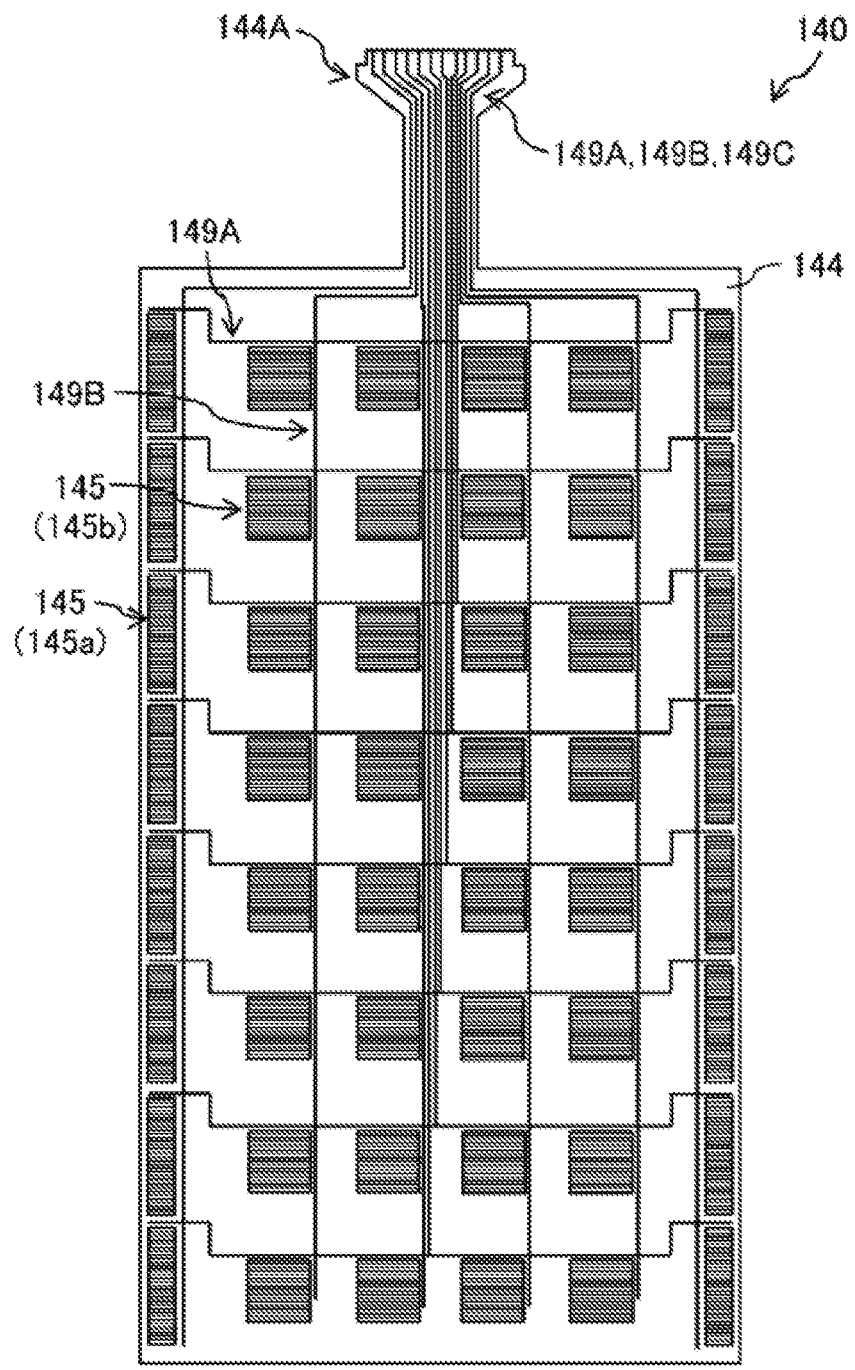

[FIG. 7]
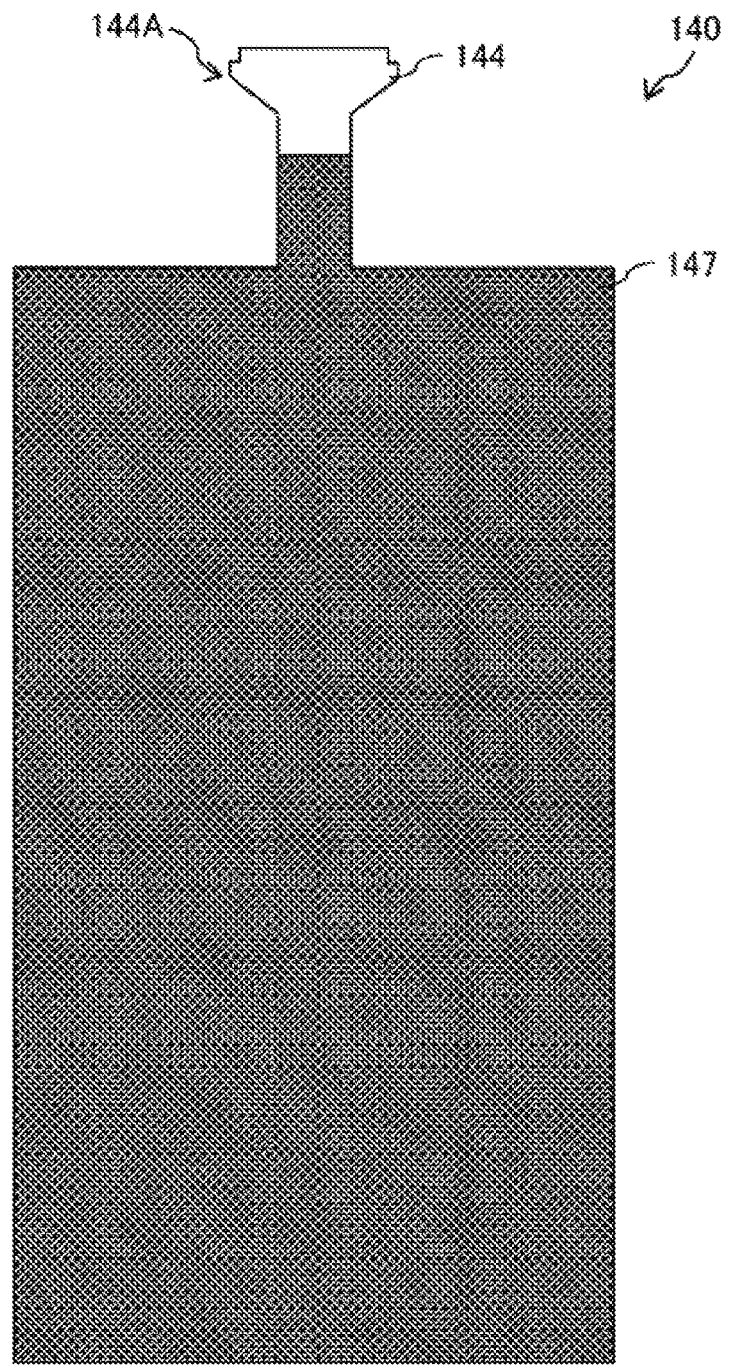

[FIG. 8]
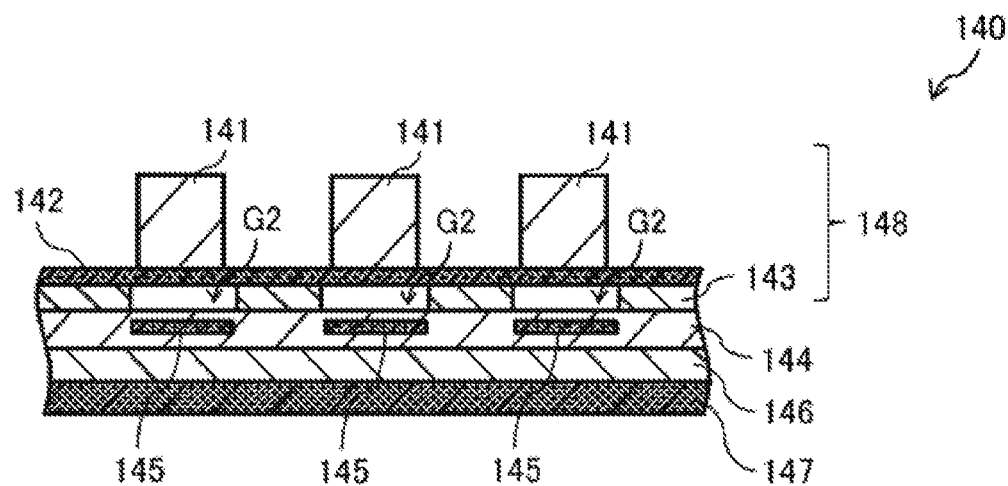
[FIG. 9]
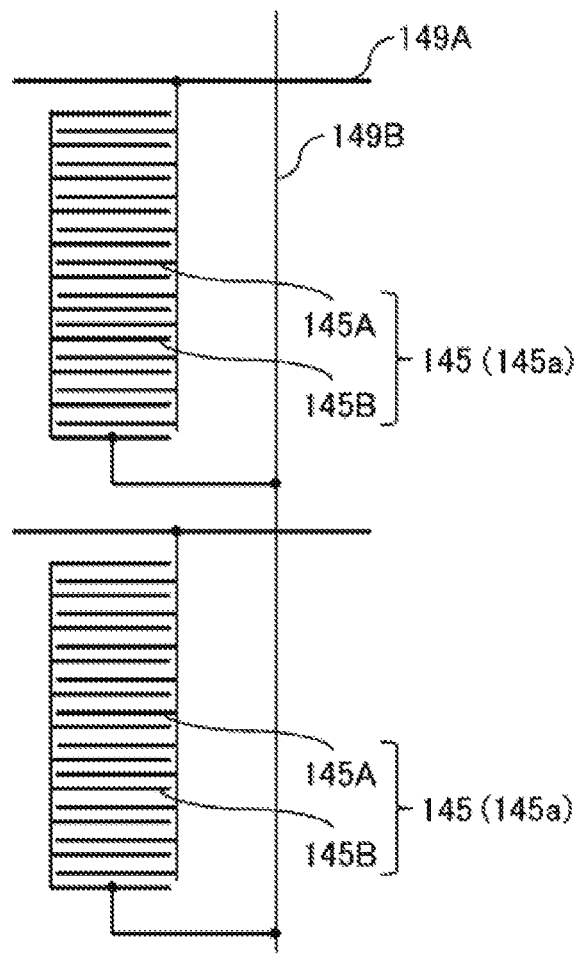

[ FIG. 10 ]
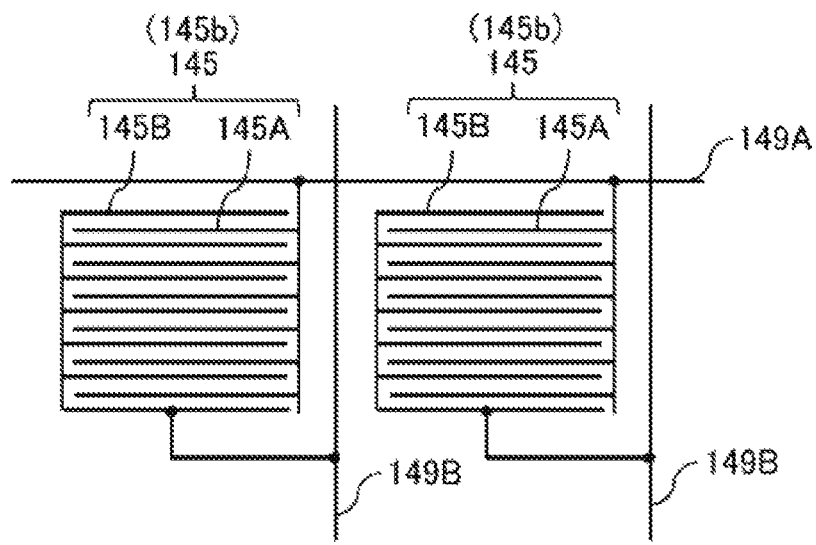
[ FIG. 11 ]
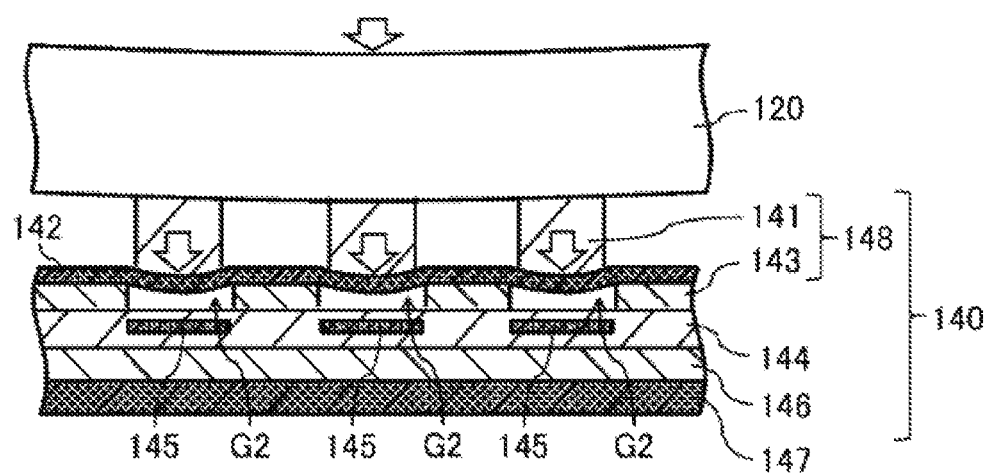

[ FIG. 12 ]
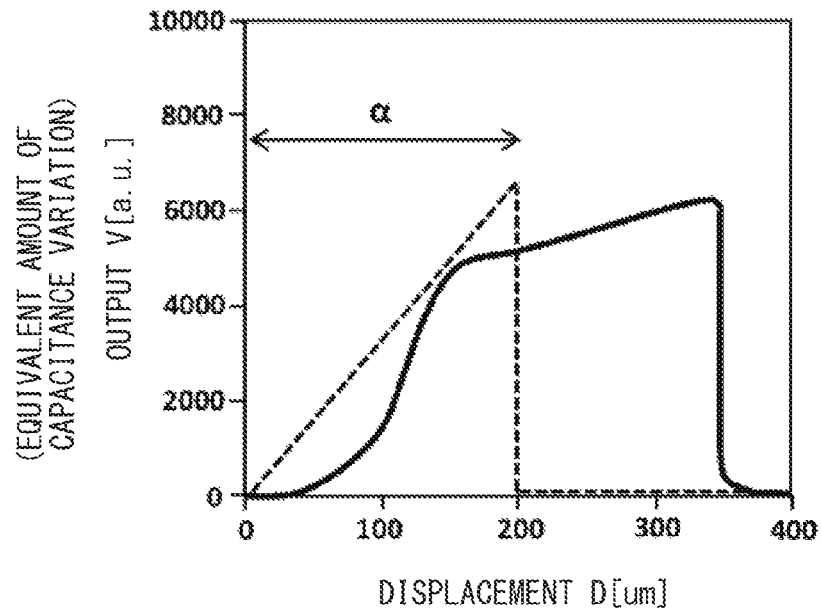
[ FIG. 13 ]
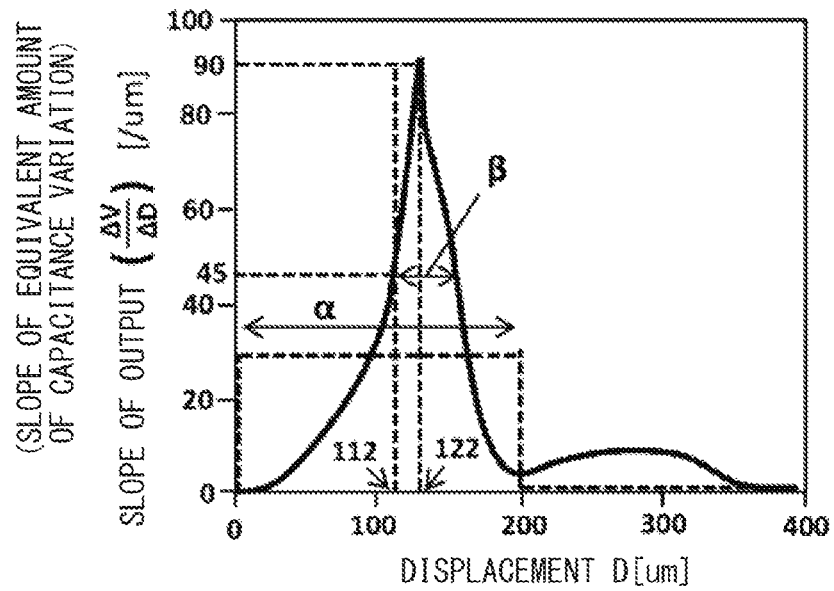

[FIG. 14]
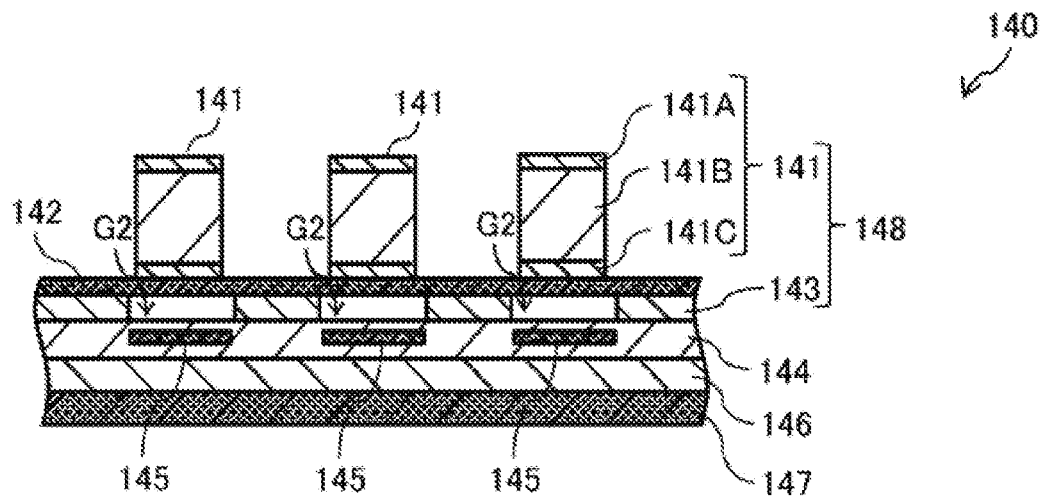
[FIG. 15]
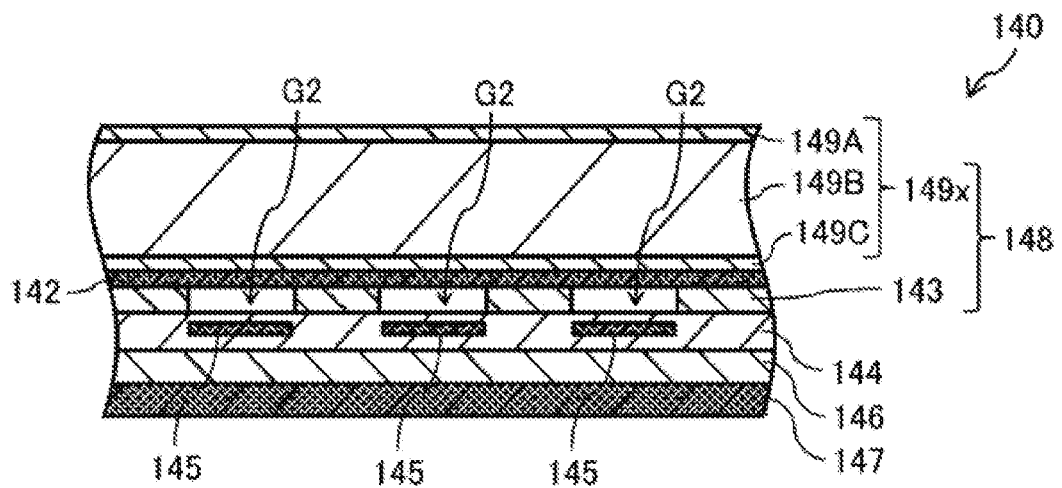
[FIG. 16]
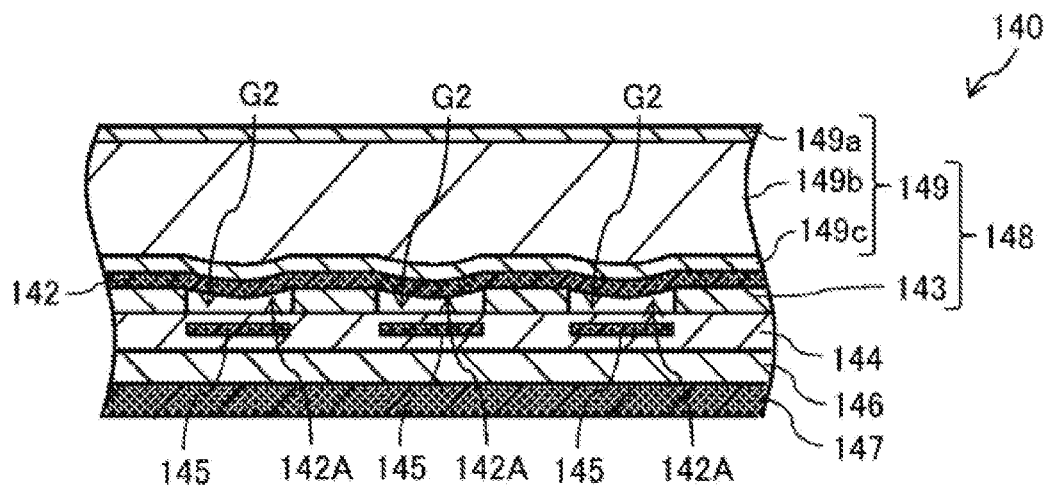

[ FIG. 17 ]
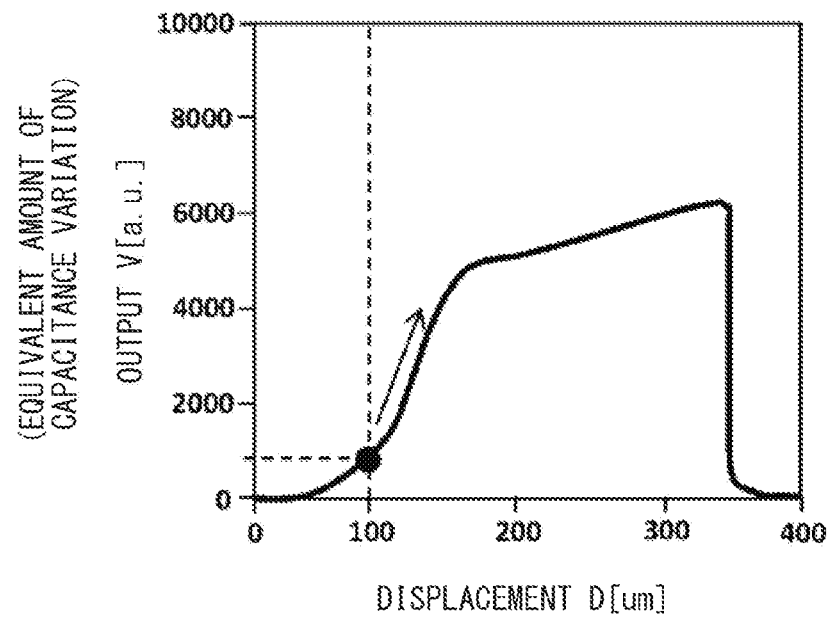
[ FIG. 18 ]
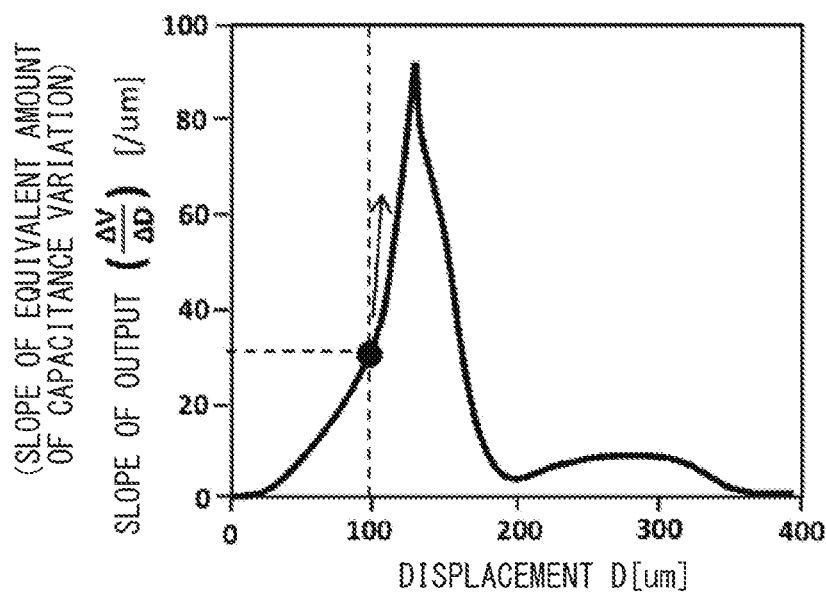

[FIG. 19]
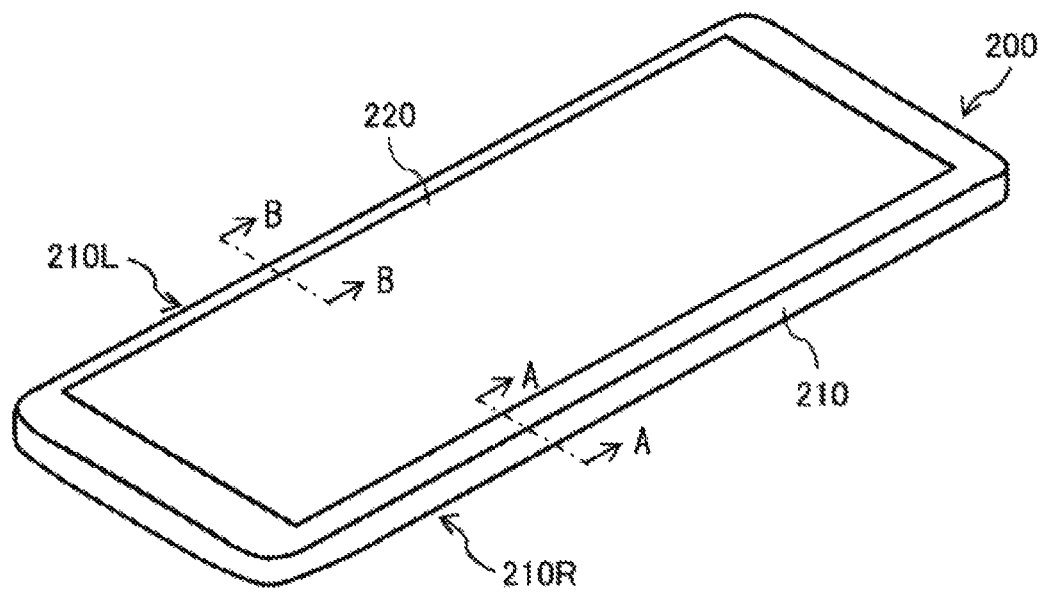
[FIG. 20]
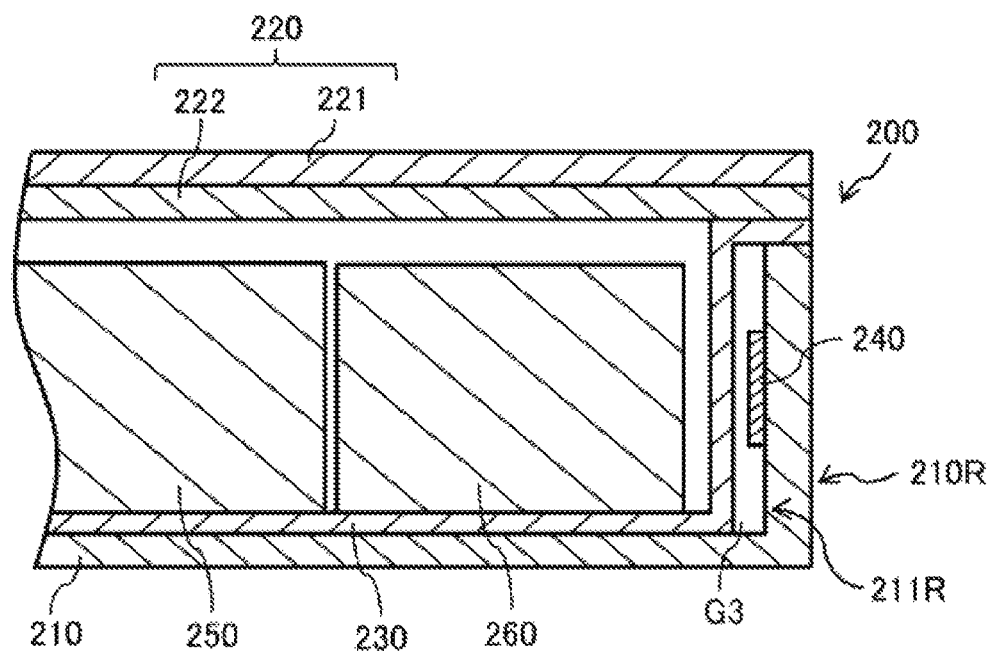

[FIG. 21]
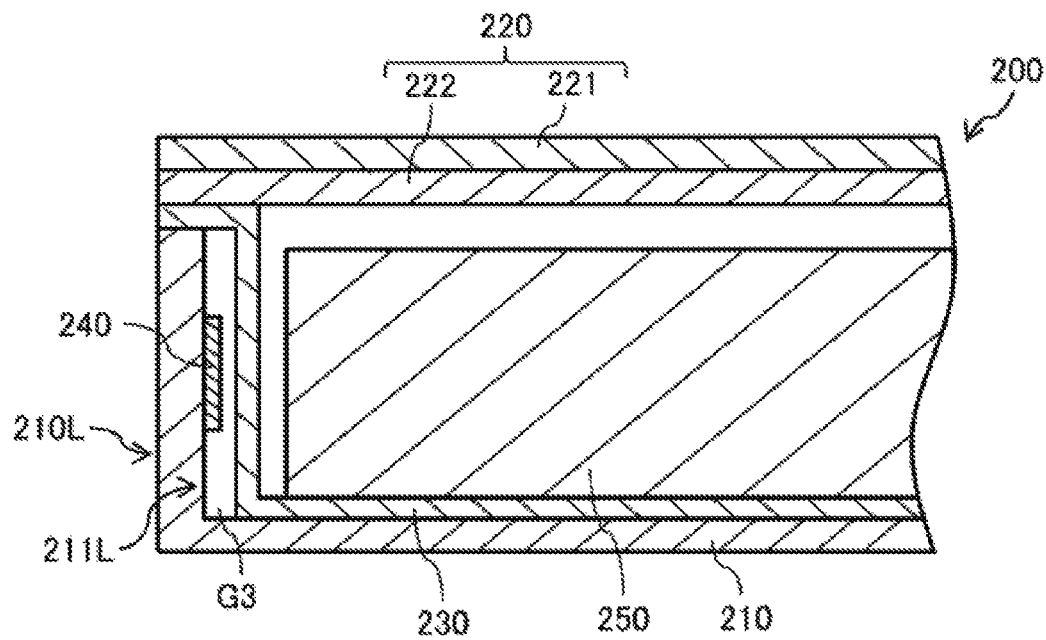
[FIG. 22]
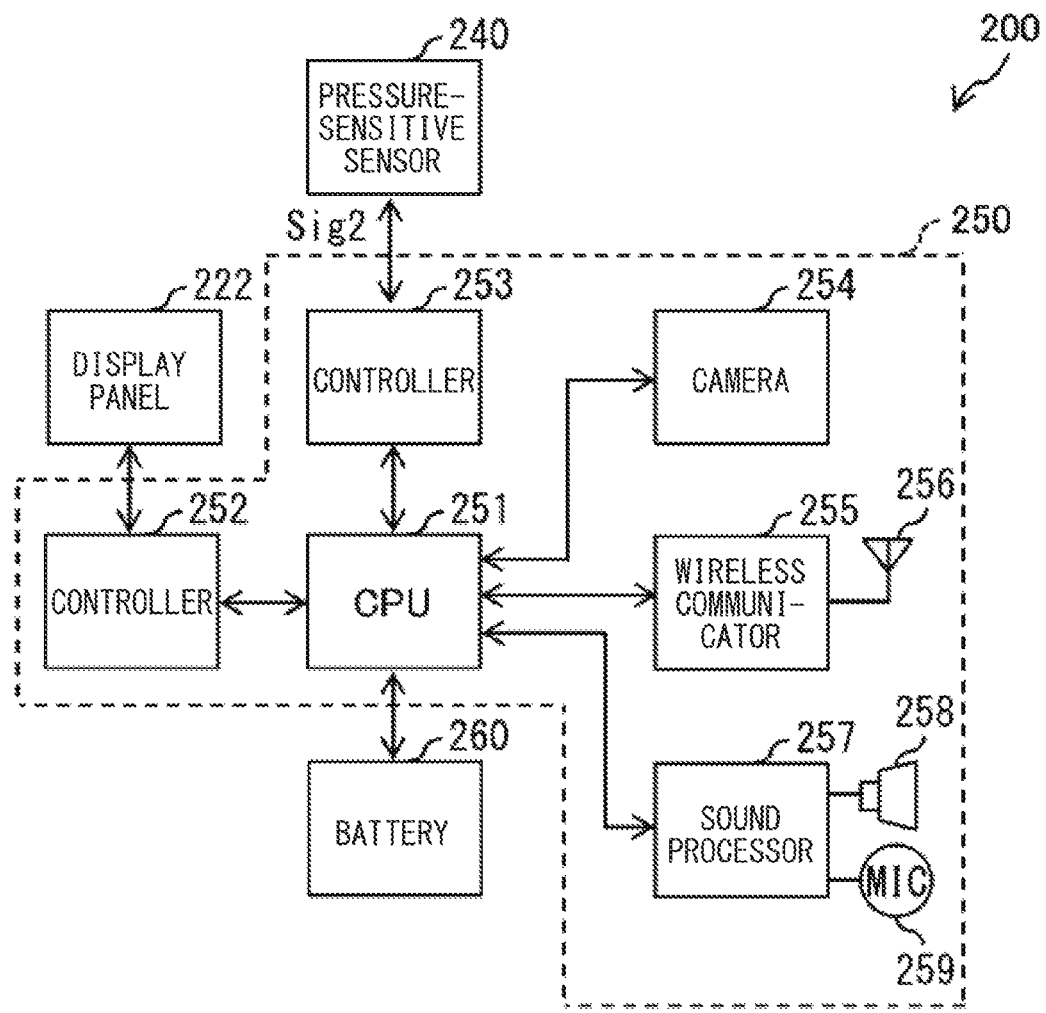

[ FIG. 23 ]
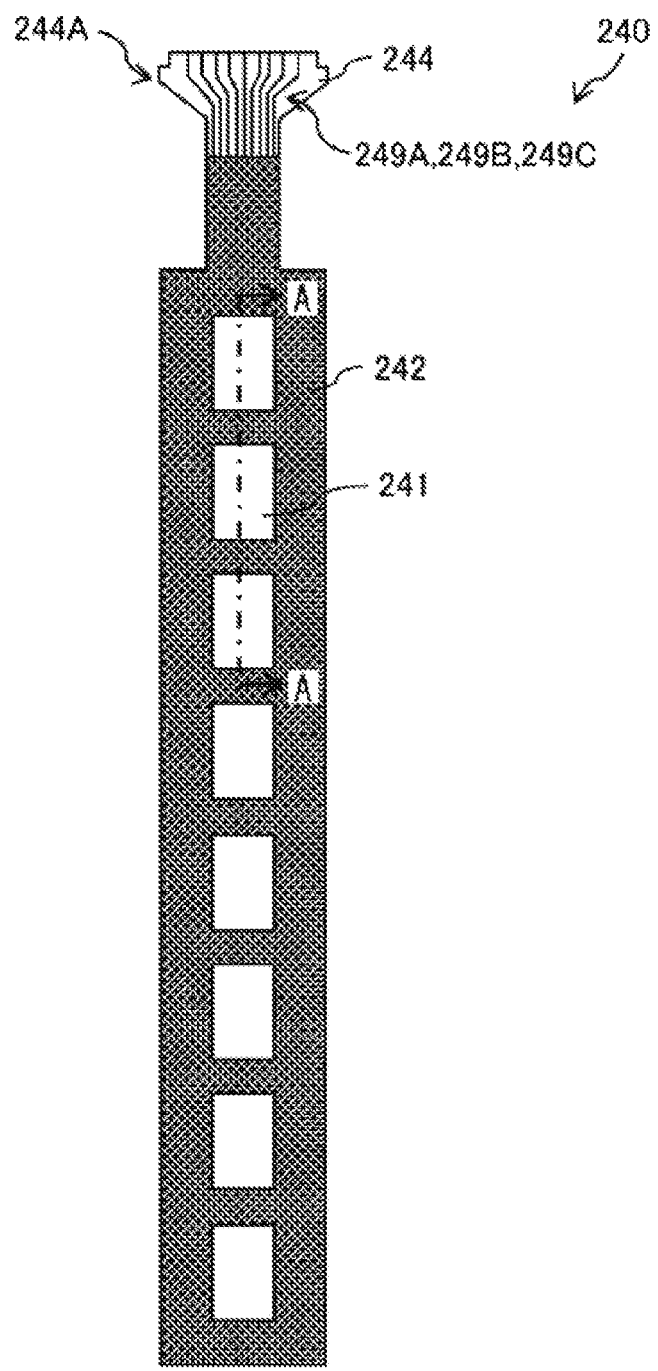

[FIG. 24]
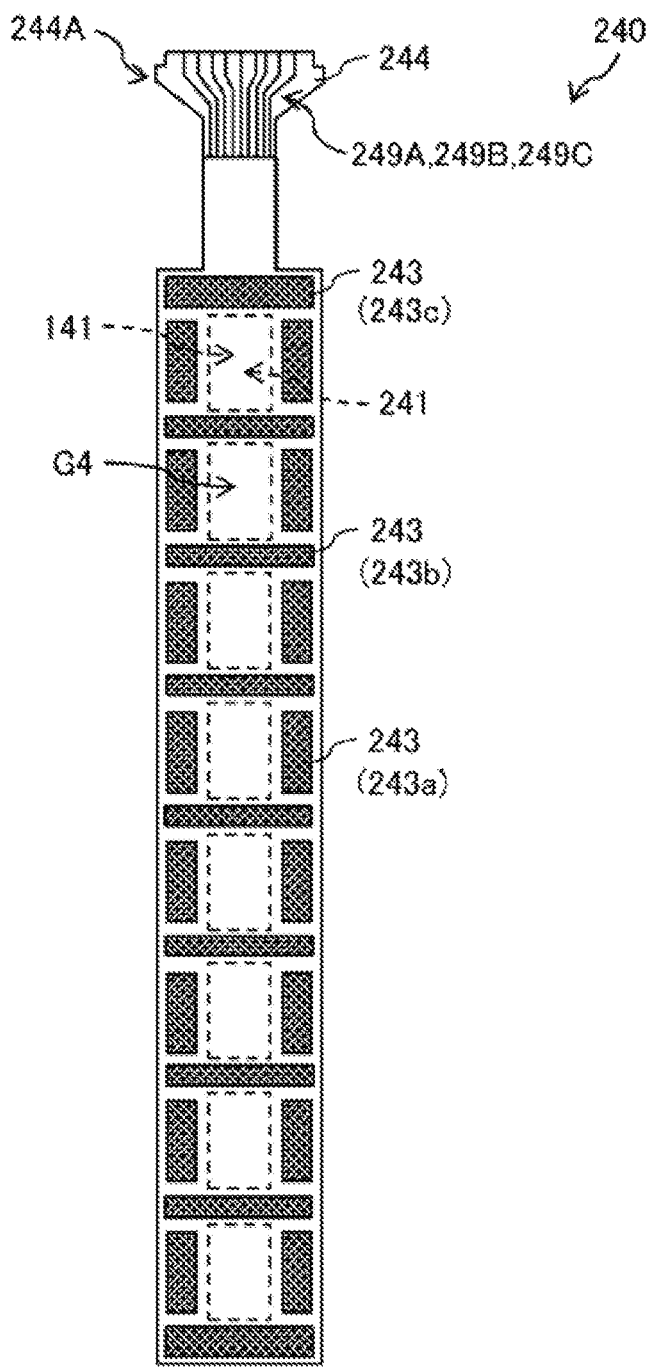

[FIG. 25]
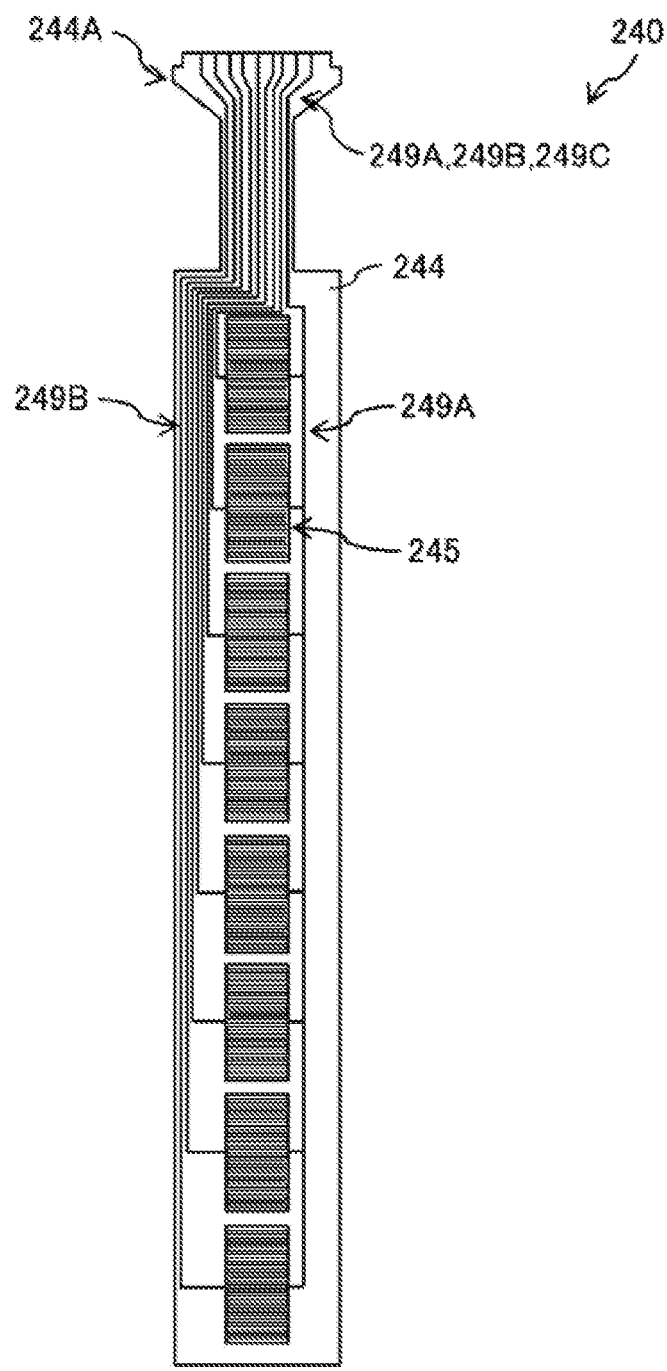

[FIG. 26]
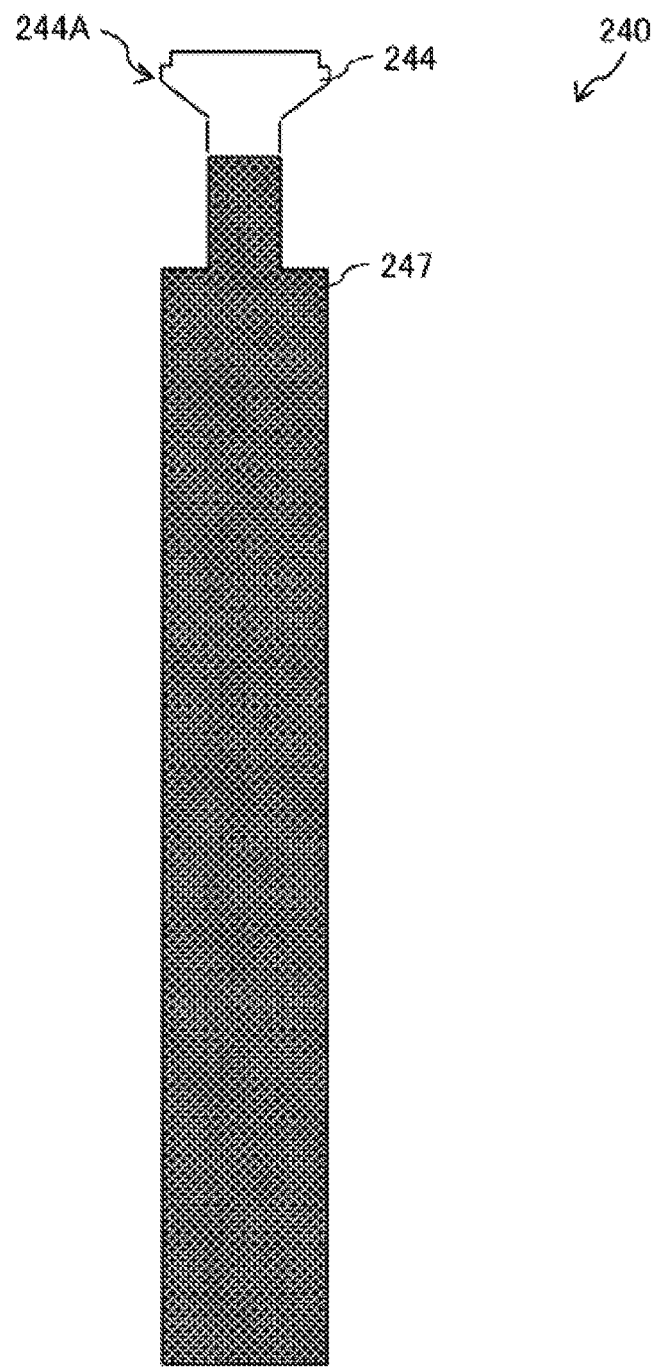

[FIG. 27]
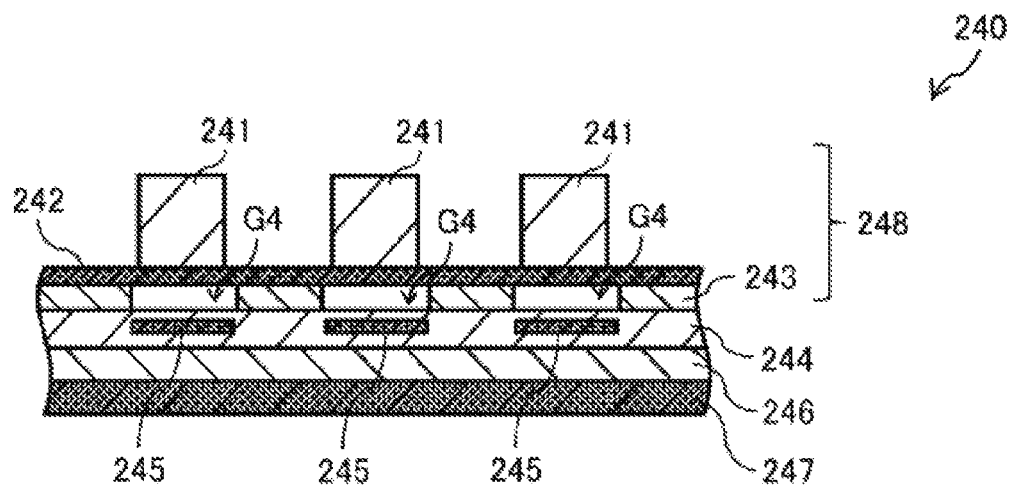
[FIG. 28]
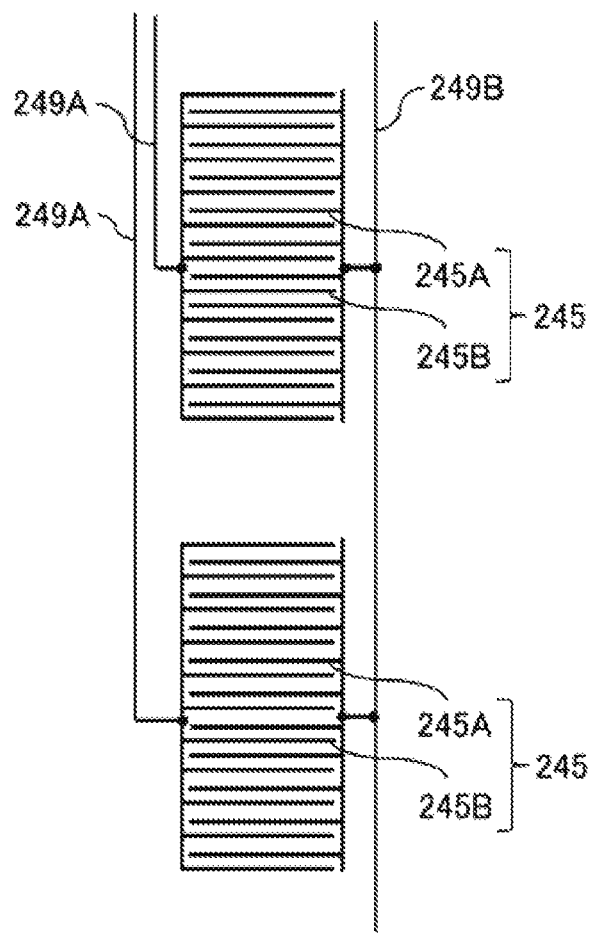

[ FIG. 29 ]
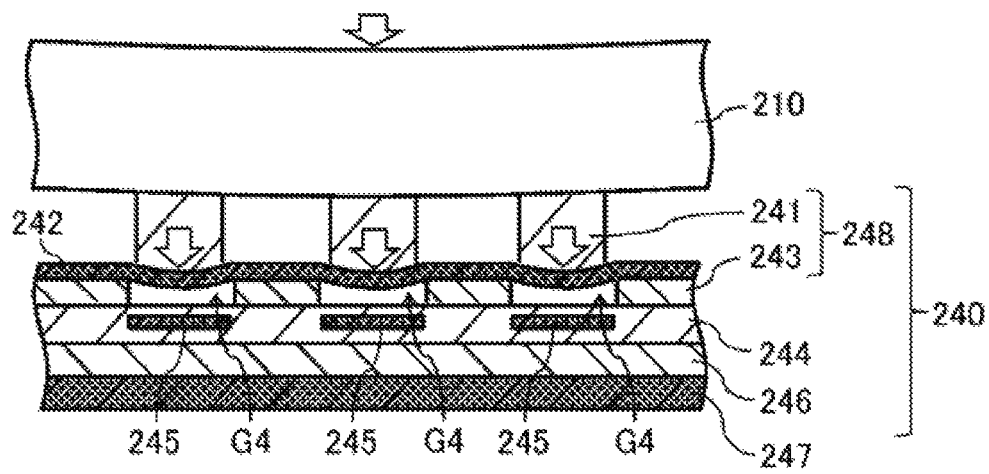
[ FIG. 30 ]
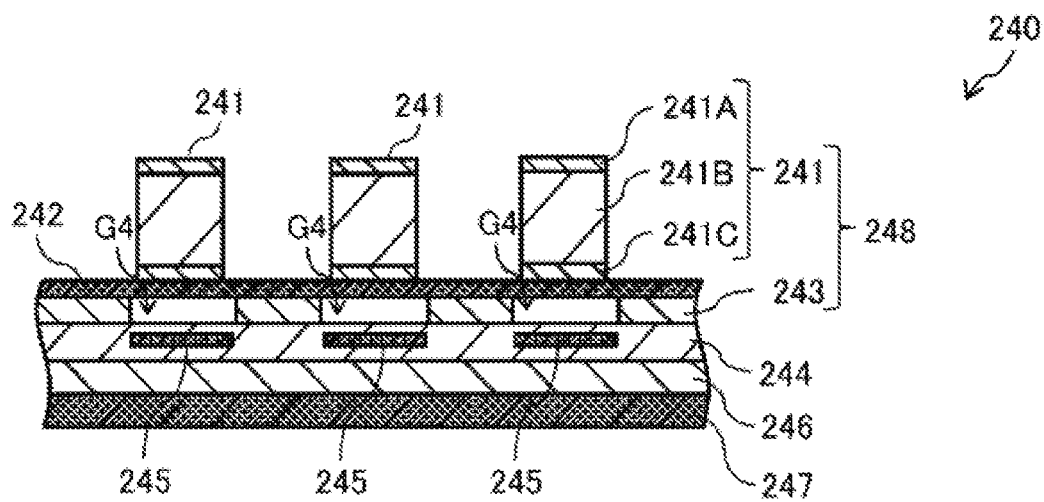

[ FIG. 31 ]
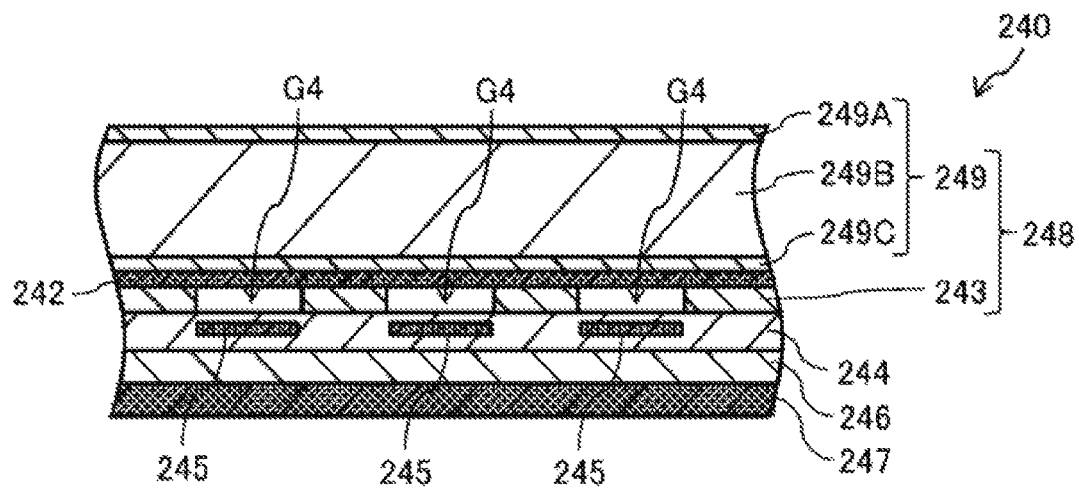
[ FIG. 32 ]
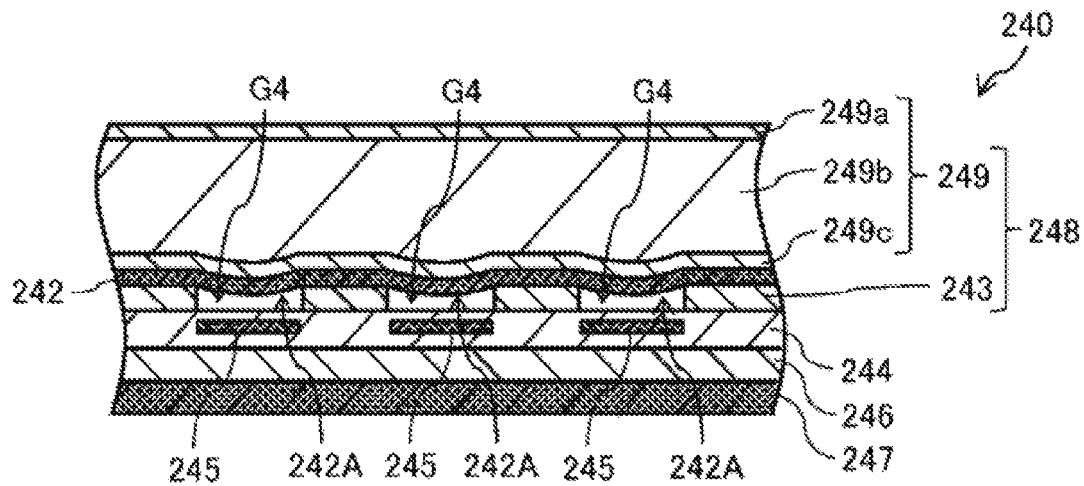

SENSOR DEVICE, INPUT DEVICE, AND ELECTRONIC APPARATUS

CROSS REFERENCE TO RELATED APPLICATIONS

This application is a U.S. National Phase of International Patent Application No. PCT/JP2019/047580 filed on Dec. 5, 2019, which claims priority benefit of Japanese Patent Application No. JP 2019-003526 filed in the Japan Patent Office on Jan. 11, 2019. Each of the above-referenced applications is hereby incorporated herein by reference in its entirety.

TECHNICAL FIELD

The present disclosure relates to a sensor device that detects pressing performed by a user, and to an input device and an electronic apparatus that include the sensor device.

BACKGROUND ART

In recent years, an electronic apparatus capable of detecting pressing performed on a surface of a housing has been proposed. For example, as one of such an electronic apparatus, Patent Literature 1 proposes an electronic apparatus in which a film-like sensor device is provided on an inner side face of the housing.

CITATION LIST

Patent Literature

Patent Literature 1: International Publication No. 2016/143241

SUMMARY OF THE INVENTION

Incidentally, a housing and a front panel of an electronic apparatus generally have a higher rigidity. Accordingly, a sensor device having a good sensitivity is desired. It is therefore desirable to provide a sensor device that makes it possible to detect pressing performed on a surface of a housing or a front panel with a good sensitivity, as well as an input device and an electronic apparatus that include the sensor device.

A sensor device according to one embodiment of the present disclosure includes: a plurality of detection electrode sections of a capacitive type; a reference electrode layer disposed at a position that faces each of the detection electrode sections; and a pressing transmission layer that causes locations, of the reference electrode layer, that face the respective detection electrode sections to be deformed locally in response to pressing performed from outside.

An input device according to one embodiment of the present disclosure includes: a sensor unit that generates a detection signal in response to pressing performed from outside; and a signal processor that controls the sensor unit, and processes the detection signal generated by the sensor unit. The sensor unit includes a plurality of detection electrode sections of a capacitive type, in which the plurality of detection electrode sections generates the detection signal, a reference electrode layer disposed at a position that faces each of the detection electrode sections, and a pressing transmission layer that causes locations, of the reference electrode layer, that face the respective detection electrode sections to be deformed locally in response to the pressing.

An electronic apparatus according to one embodiment of the present disclosure includes: a functional unit having a predetermined function; a sensor unit that generates a detection signal in response to pressing performed from outside; and a signal processor that controls the sensor unit, and controls the functional unit on the basis of the detection signal generated by the sensor unit. The sensor unit includes a plurality of detection electrode sections of a capacitive type, in which the plurality of detection electrode sections generates the detection signal, a reference electrode layer disposed at a position that faces each of the detection electrode sections, and a pressing transmission layer that causes locations, of the reference electrode layer, that face the respective detection electrode sections to be deformed locally in response to the pressing.

In the sensor device, the input device, and the electronic apparatus according to one embodiment of the present disclosure, the pressing transmission layer is provided that causes the locations, of the reference electrode layer, that face the respective detection electrode sections to be deformed locally in response to the pressing performed from the outside. Thus, a minute displacement resulting from the pressing performed from the outside is transmitted to the reference electrode layer via the pressing transmission layer, thereby locally deforming the locations, of the reference electrode layer, that face the respective detection electrode sections. The local deformation of the reference electrode layer changes a capacitance generated between the reference electrode layer and the detection electrode sections, and a change in the capacitance is detected by the detection electrode sections. Accordingly, in the present disclosure, the minute displacement resulting from the pressing performed from the outside is converted by the pressing transmission layer into the local displacement of the reference electrode layer. Hence, even in a case where the displacement resulting from the pressing performed from the outside is minute, it is possible to detect the displacement.

BRIEF DESCRIPTION OF THE DRAWINGS

FIG. 1 is a diagram illustrating a perspective configuration example of an electronic apparatus according to a first embodiment of the present disclosure.

FIG. 2 is a diagram illustrating a cross-sectional configuration example taken along the line A-A of FIG. 1.

FIG. 3 is a diagram illustrating an example of functional blocks of the electronic apparatus of FIG. 1.

FIG. 4 is a diagram illustrating an upper surface configuration example of a pressure-sensitive sensor of FIG. 2.

FIG. 5 is a diagram illustrating an upper surface configuration example when bumps and a reference electrode layer are removed in the pressure-sensitive sensor of FIG. 4.

FIG. 6 is a diagram illustrating an upper surface configuration example when bumps and a part of FPC are removed from the pressure-sensitive sensor of FIG. 5.

FIG. 7 is a diagram illustrating a lower surface configuration example of the pressure-sensitive sensor of FIG. 2.

FIG. 8 is a diagram illustrating a cross-sectional configuration example of a portion, of the pressure-sensitive sensor of FIG. 2, corresponding to the line A-A of FIG. 4.

FIG. 9 is a diagram illustrating a configuration example of detection electrode sections of FIG. 6.

FIG. 10 is a diagram illustrating a configuration example of the detection electrode sections of FIG. 6.

FIG. 11 is a diagram illustrating an example of a state in which the pressure-sensitive sensor of FIG. 2 is deformed by pressing performed from outside.

FIG. 12 is a diagram illustrating an example of a relationship between a displacement of the reference electrode layer and an output in the pressure-sensitive sensor of FIG. 8.

FIG. 13 is a diagram illustrating an example of a relationship between the displacement of the reference electrode layer and a slope of the output in the pressure-sensitive sensor of FIG. 8.

FIG. 14 is a diagram illustrating a modification example of a cross-sectional configuration of a portion, of the pressure-sensitive sensor of FIG. 2, corresponding to the line A-A of FIG. 4.

FIG. 15 is a diagram illustrating a modification example of a cross-sectional configuration of a portion, of the pressure-sensitive sensor of FIG. 2, corresponding to the line A-A of FIG. 4.

FIG. 16 is a diagram illustrating a modification example of a cross-sectional configuration of a portion, of the pressure-sensitive sensor of FIG. 2, corresponding to the line A-A of FIG. 4.

FIG. 17 is a diagram illustrating an example of a relationship between a displacement of the reference electrode layer and an output in the pressure-sensitive sensor of FIG. 16.

FIG. 18 is a diagram illustrating an example of a relationship between the displacement of the reference electrode layer and a slope of the output in the pressure-sensitive sensor of FIG. 16.

FIG. 19 is a diagram illustrating a perspective configuration example of an electronic apparatus according to a second embodiment of the present disclosure.

FIG. 20 is a diagram illustrating a cross-sectional configuration example taken along the line A-A of FIG. 19.

FIG. 21 is a diagram illustrating a cross-sectional configuration example taken along the line B-B of FIG. 19.

FIG. 22 is a diagram illustrating an example of functional blocks of the electronic apparatus of FIG. 19.

FIG. 23 is a diagram illustrating an upper surface configuration example of a pressure-sensitive sensor of FIGS. 20 and 21.

FIG. 24 is a diagram illustrating an upper surface configuration example when bumps and a reference electrode layer are removed in the pressure-sensitive sensor of FIG. 23.

FIG. 25 is a diagram illustrating an upper surface configuration example when bumps and a part of FPC are removed from the pressure-sensitive sensor of FIG. 24.

FIG. 26 is a diagram illustrating a lower surface configuration example of the pressure-sensitive sensor of FIGS. 20 and 21.

FIG. 27 is a diagram illustrating a cross-sectional configuration example of a portion, of the pressure-sensitive sensor of FIG. 21, corresponding to the line A-A of FIG. 22.

FIG. 28 is a diagram illustrating a configuration example of detection electrode sections of FIG. 27.

FIG. 29 is a diagram illustrating an example of a state in which the pressure-sensitive sensor of FIGS. 20 and 21 is deformed by pressing performed from outside.

FIG. 30 is a diagram illustrating a cross-sectional configuration example of a portion, of the pressure-sensitive sensor of FIGS. 20 and 21, corresponding to the line A-A of FIG. 22.

FIG. 31 is a diagram illustrating a cross-sectional configuration example of a portion, of the pressure-sensitive sensor of FIGS. 20 and 21, corresponding to the line A-A of FIG. 22.

FIG. 32 is a diagram illustrating a cross-sectional configuration example of a portion, of the pressure-sensitive sensor of FIGS. 20 and 21, corresponding to the line A-A of FIG. 22.

MODES FOR CARRYING OUT THE INVENTION

The following describes embodiments of the present disclosure in detail with reference to the drawings.

It is desirable that a pressure-sensitive sensor to be mounted on an electronic apparatus such as a smartphone detect, with a high sensitivity, a minute displacement of an exterior body when a user presses a housing as an exterior body or a front panel with, for example, a finger. In addition, only a small amount of clearance (void) is present in the housing in the above-described electronic apparatus. Accordingly, it is desirable that the pressure-sensitive sensor be provided in a small clearance in the housing while compensating for a tolerance of each component in the housing in the above-described electronic apparatus. Therefore, the present disclosure proposes a pressure-sensitive sensor that makes it possible to obtain a higher sensitivity while compensating for a tolerance of each component in the housing in the above-described electronic apparatus.

1. First Embodiment

[Configuration]

An electronic apparatus 100 according to a first embodiment of the present disclosure will be described. FIG. 1 illustrates a perspective configuration example of the electronic apparatus 100 according to the present embodiment. FIG. 2 illustrates a cross-sectional configuration example taken along the line A-A of FIG. 1. The electronic apparatus 100 is a smartphone. The electronic apparatus 100 includes a housing 110 as an exterior body, a frame 130 provided on the housing 110, and a front panel 120 provided on the frame 130.

The housing 110, the frame 130, and the front panel 120 have, for example, a rectangular shape extending in predetermined directions. For example, both side faces (a right side face 110R and a left side face 110L) in a horizontal direction of the housing 110 extend in a vertical direction of the housing 110, and both side faces in the vertical direction of the housing 110 extend in the horizontal direction of the housing 110. Further, for example, both side faces in a horizontal direction of the frame 130 extend in a vertical direction of the frame 130, and both side faces in the vertical direction of the frame 130 extend in the horizontal direction of the frame 130. Further, for example, both side faces in a horizontal direction of the front panel 120 extend in a vertical direction of the front panel 120, and both side faces in the vertical direction of the front panel 120 extend in the horizontal direction of the front panel 120. In the front panel 120, surfaces of both end parts (a right end part 120R and a left end part 120L) in the horizontal direction are so shaped as to be smoothly connected to the side faces (the right side face 110R and the left side face 110L) of the housing 110. For example, the both end parts (the right end part 120R and the left end part 120L) in the horizontal direction of the front panel 120 are curved towards the housing 110 side.

The housing 110 includes, for example, a metal, a polymer resin, or a wood. Examples of the metal used for the housing 110 include a single substance such as aluminum, titanium, zinc, nickel, magnesium, copper, or iron, and an alloy containing two or more of these metals. Concrete examples of the alloy used for the housing 110 include a stainless steel (Stainless Used Steel: SUS), an aluminum alloy, a magnesium alloy, and a titanium alloy. Examples of the polymer resin used for the housing 110 include a copolymerized synthetic resin (an ABS resin) of acrylonitrile, butadiene, and styrene, a polycarbonate (PC) resin, and a PC-ABS alloy resin.

The front panel 120 includes, for example, a front glass plate 121 structuring a picture displaying surface of the electronic apparatus 100, and a display panel 122 that is in contact with a back face of the front glass plate 121. The display panel 122 corresponds to a concrete example of a "functional unit" of the present disclosure. The front glass plate 121 protects the display panel 122 from an impact from outside, and is configured by, for example, a tempered glass plate. The display panel 122 displays a picture under the control of a later-described controller 152, and includes, for example, an organic EL (electro-luminescence) panel or a liquid crystal panel. The display panel 122 is a curved panel in which a middle part is flat and end parts in the horizontal direction are curved.

The electronic apparatus 100 further includes a pressure-sensitive sensor 140, a mounting substrate 150, and a battery 160. The pressure-sensitive sensor 140 corresponds to a concrete example of a "sensor device" or a "sensor unit" of the present disclosure. The mounting substrate 150 corresponds to a concrete example of a "signal processor" of the present disclosure. A module including the pressure-sensitive sensor 140 and the mounting substrate 150 corresponds to a concrete example of an "input device" of the present disclosure. The pressure-sensitive sensor 140, the mounting substrate 150, and the battery 160 are contained in the housing 110, for example, in a space surrounded by the front panel 120 and the housing 110. The pressure-sensitive sensor 140 generates a detection signal Sig in response to pressing performed from the outside. The pressure-sensitive sensor 140 is attached to a back face 120S of the front panel 120 (specifically, a back face of the display panel 122). A face, of the pressure-sensitive sensor 140, that is on an opposite side of a face, of the pressure-sensitive sensor 140, attached to the front panel 120 faces a void G1 inside the electronic apparatus 100, and is not in contact with the mounting substrate 150 or the battery 160. That is, the void G1 is present between the mounting substrate 150 as well as the battery 160 and the pressure-sensitive sensor 140. That is, the pressure-sensitive sensor 140 is only attached to the back face 120S and is not sandwiched in the vertical direction by the front panel 120 and the mounting substrate 150 as well as the battery 160. Further, the pressure-sensitive sensor 140 has a thickness that allows the void G1 in the electronic apparatus 100 to compensate for a tolerance of each component in the electronic apparatus 100. That is, the pressure-sensitive sensor 140 has a thickness that does not influence the tolerance of each component in the electronic apparatus 100.

The battery 160 supplies electric power to the mounting substrate 150. The battery 160 includes, for example, a secondary battery and a charge-discharge control circuit that controls charge and discharge of the secondary battery. The mounting substrate 150 is configured by a printed wiring substrate and various chips, modular components, etc., that are mounted on the printed wiring substrate. For example, as illustrated in FIG. 3, CPU 151, controllers 152 and 153, a camera 154, a wireless communicator 155, an antenna 156, a sound processor 157, a speaker 158, a microphone 159, and the like are mounted on the printed wiring substrate.

The CPU 151 controls various components in the electronic apparatus 100. The CPU 151 controls, for example, the camera 154, the wireless communicator 155, the sound processor 157, and the battery 160. The CPU 151 further controls, via the controller 152, picture displaying to be performed on the display panel 122, for example. The CPU 151 further controls the pressure-sensitive sensor 140 via the controller 153 and acquires the detection signal Sig generated by the pressure-sensitive sensor 140 via the controller 153, for example. The CPU 151 further controls various components (functional units having predetermined functions) in the electronic apparatus 100, on the basis of the detection signal Sig obtained via the controller 153, for example.

For example, in a case where a predetermined location of the front panel 120 is detected on the basis of the detection signal Sig as being strongly pressed, the CPU 151 issues a command to the controller 152 to display a picture in which displaying, of the location at which the front panel 120 is strongly pressed, is enlarged. For example, in a case where a location of pressing an end part of the front panel 120 is detected on the basis of the detection signal Sig as being varied in a longitudinal direction of the front panel 120, the CPU 151 outputs, to a predetermined component (a functional unit having a predetermined function) in the electronic apparatus 100, a predetermined command that is based on an amount of variation and a direction of variation in the pressing location.

The controller 152 controls the picture displaying to be performed on the display panel 122, in accordance with the control of the CPU 151. The controller 153 controls the pressure-sensitive sensor 140, processes the detection signal Sig generated by the pressure-sensitive sensor 140, and outputs the processed detection signal Sig to the CPU 151, in accordance with the control of the CPU 151. The camera 154 includes, for example, a CCD (Charge Coupled Device) image sensor, a CMOS (Complementary Metal Oxide Semiconductor) image sensor, or the like. The camera 154 performs imaging and outputs image data obtained by the imaging to the CPU 151, in accordance with the control of the CPU 151.

The wireless communicator 155 performs a wireless communication with a base station of a mobile telephone via an antenna 156, for example. The wireless communicator 155 includes, for example, a baseband unit, an RF (Radio Frequency) front-end unit, and the like. The sound processor 157 generates a sound signal, outputs the generated sound signal to the speaker 158, and outputs a sound signal inputted from the microphone 159 to the CPU 151, in accordance with the control of the CPU 151. The CPU 151 controls various components (the functional units having the predetermined functions) in the electronic apparatus 100, on the basis of the sound signal inputted from the sound processor 157.

Next, a configuration of the pressure-sensitive sensor 140 will be described in detail.

FIG. 4 illustrates an upper surface configuration example of the pressure-sensitive sensor 140. FIG. 5 illustrates an upper surface configuration example when later-described bumps 141 and a later-described reference electrode layer 142 are removed from the pressure-sensitive sensor 140. FIG. 6 illustrates an upper surface configuration example when later-described bumps 143 and a part of later-described FPC 144 are removed from the pressure-sensitive sensor 140. FIG. 7 illustrates a lower surface configuration example of the pressure-sensitive sensor 140. FIG. 8 illustrates a cross-sectional configuration example of a portion, of the pressure-sensitive sensor 140, corresponding to the line A-A of FIG. 4.

The pressure-sensitive sensor 140 has, for example, the plurality of bumps 141, the reference electrode layer 142, the plurality of bumps 143, the FPC 144, an adhesion layer 146, and a reference electrode layer 147 in this order from the front panel 120 side. The FPC 144 is provided with a plurality of detection electrode sections 145 of a capacitive type. In the pressure-sensitive sensor 140, the plurality of bumps 141 and the plurality of bumps 143 provided above and below the reference electrode layer 142 function as a pressing transmission layer 148 that causes locations, of the reference electrode layer 142, that face the respective detection electrode sections 145 to be deformed locally in response to pressing from the front panel 120.

The respective bumps 141 are provided at locations, of the reference electrode layer 142, that are on an opposite side of the respective bumps 143 and that face the respective detection electrode sections 145. The respective bumps 143 are provided in a layer between the FPC 144 and the reference electrode layer 142 and provided around locations that face the respective detection electrode sections 145. The respective bumps 143 form voids G2 at the locations that face the respective detection electrode sections 145. A height of each of the bumps 143 is lower than a height of each of the bumps 141. The bumps 141 and 143 are each configured by, for example, a two-sided adhesive sheet in which adhesion layers are provided on both sides of a resin film.

The plurality of bumps 141 is regularly disposed via a predetermined gap on a face, of the reference electrode layer 142, that is on an opposite side of the respective bumps 143. At locations that face the both end parts (the right end part 120R and the left end part 120L) of the front panel 120, the plurality of bumps 141 (141a) is disposed in a line in the longitudinal direction of the front panel 120, for example. The bumps 141a each have, for example, a rectangular planar configuration extending in the longitudinal direction of the front panel 120. At the locations interposed between the both end parts (the right end part 120R and the left end part 120L) of the front panel 120, the plurality of bumps 141 (141b) is disposed in a matrix in the longitudinal direction and a short direction of the front panel 120, for example. The bumps 141b each have, for example, a square planar configuration.

The plurality of bumps 143 is regularly disposed, via predetermined gaps (the voids G2), on a face, of the reference electrode layer 142, that is on the FPC 144 side. At locations near the both end parts (the right end part 120R and the left end part 120L) of the front panel 120, the plurality of bumps 143 (143a) is disposed in a line in the longitudinal direction of the front panel 120, for example. At the locations interposed between the both end parts (the right end part 120R and the left end part 120L) of the front panel 120, the plurality of bumps 143 (143b) is disposed in a matrix in the longitudinal direction and the short direction of the front panel 120, for example. The bumps 141b each have, for example, a square planar configuration.

In a region between two bumps 143b that face each other in the longitudinal direction of the front panel 120, the plurality of bumps 143 (143c) extends, for example, from the left end part 120L to the right end part 120R of the front panel 120. The bumps 143c each have, for example, a quadrate planar configuration extending in the short direction of the front panel 120. In each of a location that faces an upper end part of the front panel 120 and a location that faces a lower end part of the front panel 120, the bumps 143 (143d) extend, for example, from the left end part 120L to the right end part 120R of the front panel 120. The bumps 143d each have, for example, a quadrate planar configuration extending in the short direction of the front panel 120.

The reference electrode layer 142 is provided at a location, of the FPC 144, that faces a location other than a terminal 144A (described later) of the FPC 144, and has a sheet-like shape. The reference electrode layer 142 has a rigidity lower than that of the FPC 144, and is configured by a metal thin film or an electrically conductive fiber. Examples of the metal thin film include a SUS-sheet. Examples of the electrically conductive fiber include a conductive cloth and a conductive woven fabric cloth. The reference electrode layer 142 is a so-called grounding electrode, and has a ground potential.

The reference electrode layer 142 may be configured by, for example, an inorganic electrically conductive layer containing an inorganic-based electrically conductive material, an organic electrically conductive layer containing an organic-based electrically conductive material, and an inorganic-organic electrically conductive layer containing both the inorganic-based electrically conductive material and the organic-based electrically conductive material. The inorganic-based electrically conductive material and the organic-based electrically conductive material may be particulates.

Examples of the inorganic-based electrically conductive material include a metal and a metal oxide. Here, the metal is defined to include a metalloid. Examples of the metal include a metal such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, or lead, and an alloy containing two or more of these metals. Examples of the metal oxide include an indium tin oxide (ITO), a zinc oxide, an indium oxide, an antimony-added tin oxide, a fluorine-added tin oxide, an aluminum-added zinc oxide, a gallium-added zinc oxide, a silicon-added zinc oxide, a zinc-oxide-tin-oxide-based one, an indium-oxide-tin-oxide-based one, and a zinc-oxide-indium-oxide-magnesium-oxide-based one.

Examples of the organic-based electrically conductive material include a carbon material and a conductive polymer. Examples of the carbon material include carbon black, carbon fiber, fullerene, graphene, carbon nanotube, carbon microcoil, and nanocarbon. Examples of the conductive polymer include substituted or unsubstituted polyaniline, polypyrrole, polythiophene, and a (co) polymer including one or two kinds selected from those materials.

The FPC 144 is a flexible substrate having a higher rigidity than the reference electrode layer 142, and supports the respective detection electrode sections 145. The FPC 144 is configured by a resin substrate having flexibility. Examples of a material of the resin substrate used for the FPC 144 include polyethylene terephthalate (PET), polyethylene naphthalate (PEN), polycarbonate (PC), acrylic resin (PMMA), polyimide (PI), triacetyl cellulose (TAC), polyester, polyamide (PA), aramid, polyethylene (PE), polyacrylate, polyether sulfone, polysulfone, polypropylene (PP), diacetyl cellulose, polyvinyl chloride, epoxy resin, urea resin, urethane resin, melanin resin, and cyclic olefin polymer (COP) or norbornene-based thermoplastic resin.

In the FPC 144, the plurality of detection electrode sections 145 is regularly disposed via predetermined gaps. At locations that face the both end parts (the right end part 120R and the left end part 120L) of the front panel 120, the plurality of detection electrode sections 145 (145a) is disposed, for example, side by side along edges in the horizontal direction of the front panel 120. The detection electrode sections 145a each have, for example, a rectangular planar configuration extending along the edges in the horizontal direction of the front panel 120. The detection electrode sections 145a are each configured to be capable of forming a capacitive coupling. The detection electrode sections 145a are each configured by, for example, as illustrated in FIG. 9, a comb teeth shaped first electrode part 145A and a comb teeth shaped second electrode part 145B that face each other in a plane parallel to the reference electrode layer 142, and each detect a capacitance corresponding to a distance with respect to the reference electrode layer 142.

At the locations interposed between the both end parts (the right end part 120R and the left end part 120L) of the front panel 120, the plurality of detection electrode sections 145 (145b) is disposed in a matrix in the longitudinal direction and the short direction of the front panel 120, for example. The detection electrode sections 145b each have, for example, a square planar configuration. The detection electrode sections 145b are each configured to be capable of forming a capacitive coupling. The detection electrode sections 145b are each configured by, for example, as illustrated in FIG. 10, the comb teeth shaped first electrode part 145A and the comb teeth shaped second electrode part 145B that face each other in a plane parallel to the reference electrode layer 142, and each detect a capacitance corresponding to a distance with respect to the reference electrode layer 142. The first electrode part 145A and the second electrode part 145B are so disposed that the comb teeth of the first electrode part 145A and the comb teeth of the second electrode part 145B mesh with each other.

The FPC 144 further includes a terminal 144A, a plurality of wiring lines 149A, a plurality of wiring lines 149B, and a wiring line 149C. The terminal 144A is coupled to a connector provided at the printed wiring substrate of the mounting substrate 150. One end of each of the plurality of wiring lines 149A, the plurality of wiring lines 149B, and the wiring line 149C is disposed at the terminal 144A. Where the plurality of detection electrode sections 145 disposed side by side in the longitudinal direction of the front panel 120 is assumed as forming a single group (a first group), the plurality of wiring lines 149A is assigned one by one for each first group. The wiring lines 149A are each coupled to the first electrode part 145A of the detection electrode section 145. Where the plurality of detection electrode sections 145 disposed side by side in the short direction of the front panel 120 is assumed as forming a single group (a second group), the plurality of wiring lines 149B is assigned one by one for each second group. The wiring lines 149B are each coupled to the second electrode part 145B of the detection electrode section 145. The wiring line 149C is coupled to the reference electrode layers 142 and 147.

The reference electrode layer 147 is attached to the FPC 144 via the adhesion layer 146. The adhesion layer 146 is configured by, for example, a two-sided adhesive sheet in which adhesion layers are provided on both sides of a resin film. The reference electrode layer 147 is provided at a location, of the FPC 144, that faces a location other than the terminal 144A of the FPC 144, and has a sheet-like shape. The reference electrode layer 142 is configured by, for example, an electromagnetic shielding film in which a metal thin film and a resin layer are laminated. As a material of the reference electrode layer 147, it is possible to use a material used as the reference electrode layer 142. The reference electrode layer 147 is a so-called grounding electrode, and has a ground potential.

The reference electrode layers 142 and 147 are so disposed as to sandwich the plurality of detection electrode sections 145 as described above. Accordingly, the reference electrode layers 142 and 147 each have a function of suppressing an external noise (an external electric field) from entering each of the detection electrode sections 145.

Next, a pressing detection performed in the pressure-sensitive sensor 140 will be described.

First, the CPU 151 controls the pressure-sensitive sensor 140 via the controller 153. At this time, the controller 153 performs, via the plurality of wiring lines 149A and 149B, matrix driving of the plurality of detection electrode sections 145 provided in the pressure-sensitive sensor 140. The controller 153 acquires, by the matrix driving, the detection signal Sig generated by each of the detection electrode sections 145, and outputs the acquired detection signals Sig to the CPU 151. The CPU 151 performs the control corresponding to a pressed position, on the basis of the inputted detection signal Sig of each of the detection electrode sections 145.

For example, as illustrated in FIG. 11, it is assumed that the front panel 120 is pressed by a user. At this time, the front panel 120 is slightly curved by the pressing performed by the user. The curving of the front panel 120 depresses one or the plurality of bumps 141 of the pressing transmission layer 148, and the depressed one or plurality of bumps 141 depresses the reference electrode layer 142. At this time, the plurality of bumps 143 positioned below the reference electrode layer 142 supports portions, of the reference electrode layer 142, that are not opposed to the respective bumps 141. Thus, a portion, of the reference electrode layer 142, that faces the depressed one or plurality of bumps 141 is locally curved. The local curving of the reference electrode layer 142 narrows the void G2 between the detection electrode section 145 and the reference electrode layer 142, allowing the capacitance occurring between the detection electrode section 145 and the reference electrode layer 142 to vary in response to the change in the void G2 (the displacement D). An output V (the detection signal Sig) of the pressure-sensitive sensor 140 varies in response to an amount of variation in the capacitance (the displacement D of the void G2). The output V of the pressure-sensitive sensor 140 varies, for example, as illustrated by a solid line in FIG. 12. At this time, a slope ($\Delta V/\Delta D$) of the output V of the pressure-sensitive sensor 140 varies, for example, as illustrated by a solid line in FIG. 13.

Ideally, the output V of the pressure-sensitive sensor 140 varies linearly at a predetermined area α of the displacement D, as illustrated by a dashed line in FIG. 12. Further, ideally, the slope ($\Delta V/\Delta D$) of the output V of the pressure-sensitive sensor 140 has a constant value at the predetermined area α of the displacement D, as illustrated by a dashed line in FIG. 13. In a case where the output V and the slope ($\Delta V/\Delta D$) of the output V of the pressure-sensitive sensor 140 are ideally set, an operation load is 1 when the displacement D at the time of mounting is within the predetermined area α due to a tolerance of the front panel 120.

The operation load refers to (a maximum value of the slope ($\Delta V/\Delta D$) of the output V)/(a minimum value of the slope ($\Delta V/\Delta D$) of the output V). In the above example, the operation load is 30/30=1. In a case where the operation load is 1, pressing force of the front panel 120 necessary for the user to turn on an application is constant regardless of a location, and an operation feeling to be felt by the user is constant regardless of the location. Further, in this case, a size of the area α becomes a tolerance compensation width of the pressure-sensitive sensor 140, which is larger than the tolerance of the front panel 120.

Actually, the output V of the pressure-sensitive sensor 140 is nonlinear, for example, as illustrated by the solid line in FIG. 12, and the slope (ΔV/ΔD) of the output V of the pressure-sensitive sensor 140 has a peak, as illustrated by the solid line in FIG. 13. In this case, when there is a location (a location A) at which the displacement D at the time of mounting is 112 μm at the maximum due to the tolerance of the front panel 120, the slope (ΔV/ΔD) of the output V of the pressure-sensitive sensor 140 at the location A has a value that is half the value (e.g., 45 [/μm]) of a peak value (e.g., 90 [/μm]). At this time, the operation load is 90/45=2, and a tolerance compensation of the pressure-sensitive sensor 140 has a magnitude illustrated by β in FIG. 13. Further, when there is a location (a location B) at which the displacement D at the time of mounting is 90 μm due to the tolerance of the front panel 120, the slope (ΔV/ΔD) of the output V of the pressure-sensitive sensor 140 at the location B has a value that is ¼ (e.g., 22.5 [/μm]) of a peak value (e.g., 90 [/μm]). At this time, the operation load is 90/22.5=4.

The operation load at the location where the displacement D is 112 μm is two times the operation load at the location where the displacement D is 122 μm. In this case, in order to achieve the same variation in the sensor output value, the user feels two times the difference for the operation load. Further, the operation load at the location where the displacement D is 90 μm is four times the operation load at the location where the displacement D is 122 μm. In this case, in order to achieve the same variation in the sensor output value, the user feels four times the difference for the operation load. If the operation load differs too much from the displacement to the displacement, the user can feel a sense of discomfort. Accordingly, a ratio between a maximum value Max of the operation load and a minimum value Min of the operation load (Max/Min) is defined. In order for the user not to feel a sense of discomfort for the operation load, it is preferable that Max/Min be as small as possible, preferably 2.5 or less, more preferably 2.0 or less, and ideally 1.5 or less.

Note that the minimum value Min of the operation load is a value corresponding to the maximum value among the values of the slope (ΔV/ΔD) of the sensor output value. This is because the operation load is inversely proportional to the value of the slope (ΔV/ΔD) of the output V. The maximum value Max of the operation load is a value corresponding to a value that is ½ of the maximum value among the values of the slope (ΔV/ΔD) of the output V. If an SN ratio is about 10/μm (the SN ratio>about 25/2.5 μm), it is possible for the controller 153 to differentiate the sensor output from a noise sufficiently. Accordingly, the pressure-sensitive sensor 140 preferably has a sensitivity that allows the controller 153 to detect the sensor output when a location to which the pressure-sensitive sensor 140 is attached (e.g., the front panel 120) is deformed by 2.5 μm.

[Effects]

Next, effects of the electronic apparatus 100 according to the present embodiment will be described.

It is conceivable to detect a displacement of a front panel of an electronic apparatus by means of a pressure-sensitive sensor, by attaching the pressure-sensitive sensor to a back face of the front panel of the electronic apparatus. However, the front panel of the electronic apparatus generally has a higher rigidity. Accordingly, it is necessary for the pressure-sensitive sensor to detect a small displacement of the front panel of the electronic apparatus. In addition, a tolerance of various components inside the electronic apparatus and a tolerance compensation such as variation upon mounting of the pressure-sensitive sensor become a trade-off with a sensor sensitivity, and the sensor sensitivity may become sufficient. In addition, problems arise in practical use such as differentiating the intensity of pressure sensing at multiple levels or suppressing the variation of the set force, and the performance of the electronic apparatus on which pressure-sensitive sensor is mounted may be deteriorated.

In the present embodiment, the pressing transmission layer 148 is provided that causes the locations, of the reference electrode layer 142, that face the respective detection electrode sections 145 to be deformed locally in response to the pressing performed from the outside. Thus, a minute displacement resulting from the pressing performed from the outside is transmitted to the reference electrode layer 142 via the pressing transmission layer 148, thereby locally deforming the locations, of the reference electrode layer 142, that face the respective detection electrode sections 145. The local deformation of the reference electrode layer 142 changes the capacitance generated between the reference electrode layer 142 and the detection electrode sections 145, and the change in the capacitance is detected by the detection electrode sections 145. Accordingly, in the present embodiment, the minute displacement resulting from the pressing performed from the outside is converted by the pressing transmission layer 148 into the local displacement of the reference electrode layer 142. Hence, even in a case where the displacement resulting from the pressing performed from the outside is minute, it is possible to detect the displacement.

Further, in the present embodiment, the FPC 144 that supports each of the detection electrode sections 145 has a higher rigidity than the reference electrode layer 142. In other words, the reference electrode layer 142 is softer than the FPC 144. The reference electrode layer 142 is configured by, for example, the metal thin film or the electrically conductive fiber. Thus, a minute displacement resulting from the pressing performed from the outside is transmitted to the reference electrode layer 142 via the pressing transmission layer 148, thereby locally deforming the locations, of the reference electrode layer 142, that face the respective detection electrode sections 145. Hence, even in a case where the displacement resulting from the pressing performed from the outside is minute, it is possible to detect the displacement.

Further, in the present embodiment, the detection electrode sections 145 are each configured by the comb teeth shaped first electrode part 145A and the comb teeth shaped second electrode part 145B that face each other in a plane parallel to the reference electrode layer 142, and each detect the capacitance corresponding to a distance with respect to the reference electrode layer 142. Thus, for example, a leakage of an electric field becomes large and the variation in the capacitance corresponding to the distance with respect to the reference electrode layer 142 becomes large as compared with a case where the first electrode part 145A and the second electrode part 145B are so disposed as to face each other in a thickness direction. Hence, even in a case where the displacement resulting from the pressing performed from the outside is minute, it is possible to detect the displacement.

Further, in the present embodiment, the plurality of bumps 141 and the plurality of bumps 143 are provided above and below the reference electrode layer 142. Thus, it is possible to transmit, to the reference electrode layer 142, the displacement resulting from the pressing performed from the outside, as compared with a case where the plurality of bumps 143 is provided only below the reference electrode layer 142. Hence, even in a case where the displacement resulting from the pressing performed from the outside is minute, it is possible to detect the displacement.

Further, in the present embodiment, the height of each of the bumps 143 is lower than the height of each of the bumps 141. Thus, it is possible to detect the local displacement of the reference electrode layer 142 effectively as compared with a case where the height of each of the bumps 143 is higher than the height of each of the bumps 141. Hence, even in a case where the displacement resulting from the pressing performed from the outside is minute, it is possible to detect the displacement.

Further, in the present embodiment, the respective bumps 141 and the respective bumps 143 are both configured by the two-sided adhesive sheet in which the adhesion layers are provided on both sides of the resin film. Hence, it is possible to generate the local displacement of the reference electrode layer 142 effectively without damaging the reference electrode layer 142.

Further, in the present embodiment, a face, of the pressure-sensitive sensor 140, that is on a side of the pressing transmission layer 148 is attached to the back face of the display panel 122 (the back face 120S of the front panel 120). Thus, the pressure-sensitive sensor 140 functions as a touch sensor. Furthermore, a face, of the pressure-sensitive sensor 140, that is on an opposite side of the pressing transmission layer 148 faces the void G1 inside the electronic apparatus 100. That is, the pressure-sensitive sensor 140 is only attached to the back face 120S and is not sandwiched in the vertical direction by the front panel 120 and the mounting substrate 150 as well as the battery 160. Accordingly, for the pressure-sensitive sensor 140, it is only necessary to take into consideration the deformation caused by the tolerance of the front panel 120, and it is not necessary to take into consideration the deformation caused by a tolerance of the mounting substrate 150 or the battery 160. Hence, it is possible to reduce the degree of difficulty in designing the pressure-sensitive sensor 140.

Further, in the present embodiment, the display panel 122 is a curved panel in which the middle part is flat and the end parts are curved. Furthermore, the plurality of detection electrode sections 145a is disposed side by side along the edges of the display panel 122 at locations that face the curved parts of the display panel 122. Hence, for example, in a case where the user has varied a location of pressing along the edge of the display panel 122, it is possible for the CPU 151 to output, to a predetermined component (the functional unit having the predetermined function) in the electronic apparatus 100, a command that is based on an amount of variation and a direction of variation in the pressing location.

2. Modification Examples

Next, modification examples of the pressure-sensitive sensor 140 according to the above embodiment will be described.

Modification Example A

FIG. 14 illustrates a modification example of a cross-sectional configuration of the pressure-sensitive sensor 140. In the pressure-sensitive sensor 140 according to the above embodiment, the bumps 141 each may include, for example, a porous layer 141B. The bumps 141 are each a stacked body in which, for example, adhesion layers 141A and 141C are provided on both sides of the porous layer 141B. Examples of the porous layer 141B include a sponge. Even in such a case, it is possible to detect a minute displacement resulting from the pressing performed from the outside as with the above embodiment.

Modification Example B

FIG. 15 illustrates a modification example of a cross-sectional configuration of the pressure-sensitive sensor 140. In the pressure-sensitive sensor 140 according to the above embodiment, a sheet-like elastic layer 149$x$ may be provided instead of the plurality of bumps 141. The elastic layer 149$x$ is provided on a side, of the reference electrode layer 142, that is on an opposite side of the bumps 143, and has a lower rigidity than the FPC 144. The elastic layer 149$x$ may include, for example, a porous layer 149$b$. The elastic layer 149$x$ is a stacked body in which, for example, adhesion layers 149A and 149C are provided on both sides of the porous layer 149$b$. Examples of the porous layer 149$b$ include a sponge. In the present modification example, the height of each of the bumps 143 is lower than a thickness of the elastic layer 149$x$.

In the present modification example, when the front panel 120 is slightly curved by the pressing performed by the user, the curving of the front panel 120 depresses the elastic layer 149$x$ of the pressing transmission layer 148, and the depressed elastic layer 149$x$ depresses the reference electrode layer 142. At this time, the plurality of bumps 143 positioned below the reference electrode layer 142 is regularly disposed via the voids G2. Thus, a portion, of the reference electrode layer 142, that faces the void G2 is locally curved. The local curving of the reference electrode layer 142 narrows the void G2 between the detection electrode section 145 and the reference electrode layer 142, allowing the capacitance occurring between the detection electrode section 145 and the reference electrode layer 142 to vary in response to the change in the void G2 (the displacement D). The output V (the detection signal Sig) of the pressure-sensitive sensor 140 varies in response to the amount of variation in the capacitance (the displacement D of the void G2). The output V of the pressure-sensitive sensor 140 varies, for example, as illustrated by the solid line in FIG. 12. At this time, the slope ($\Delta V/\Delta D$) of the output V of the pressure-sensitive sensor 140 varies, for example, as illustrated by the solid line in FIG. 13. Hence, it is possible to detect a minute displacement resulting from the pressing performed from the outside as with the above embodiment.

Further, in the present modification example, the respective bumps 143 are both configured by the two-sided adhesive sheet in which the adhesion layers are provided on both sides of the resin film. Hence, it is possible to generate the local displacement of the reference electrode layer 142 effectively without damaging the reference electrode layer 142.

Further, in the present modification example, the height of each of the bumps 143 is lower than the thickness of the elastic layer 149$x$. Thus, it is possible to detect the local displacement of the reference electrode layer 142 effectively as compared with a case where the height of each of the bumps 143 is higher than the thickness of the elastic layer 149$x$. Hence, even in a case where the displacement resulting from the pressing performed from the outside is minute, it is possible to detect the displacement.

Modification Example C

FIG. 16 illustrates a modification example of a cross-sectional configuration of the pressure-sensitive sensor 140.

In the above modification example B, the reference electrode layer 142 may have, at the locations that face the respective detection electrode sections 145 (that is, locations facing the voids G2), curved sections 142A that protrude towards the detection electrode section 145 side. In this case, the void G2 is already displaced by an amount of the protrusion (e.g., 100 µm) of the curved section 142A. Thus, the output V of the pressure-sensitive sensor 140 and the slope ($\Delta V/\Delta D$) of the output V start from values shifted by the amount of the protrusion of the curved section 142A (e.g., 100 µm) as illustrated in FIGS. 17 and 18, for example. As a result, the slope ($\Delta V/\Delta D$) of the output V of the pressure-sensitive sensor 140 reaches the peak value by slight pressing as compared with a case where no curved section 142A is provided. Hence, in the present modification example, it is possible to detect a minute displacement resulting from the pressing performed from the outside with higher accuracy as compared with the above embodiment and its modification examples.

2. Second Embodiment

[Configuration]

An electronic apparatus 200 according to a second embodiment of the present disclosure will be described. FIG. 19 illustrates a perspective configuration example of the electronic apparatus 200 according to the present embodiment. FIG. 20 illustrates a cross-sectional configuration example taken along the line A-A of FIG. 19. The electronic apparatus 200 is a smartphone. The electronic apparatus 200 includes a housing 210 as an exterior body, a frame 230 provided on the housing 210, and a front panel 220 provided on the frame 230.

The housing 210, the frame 230, and the front panel 220 have, for example, a rectangular shape extending in predetermined directions. For example, both side faces (side faces 210R and 210L) in a horizontal direction of the housing 210 extend in a longitudinal direction of the housing 210, and both side faces in a vertical direction of the housing 210 extend in a short direction of the housing 210. Further, for example, both side faces in a horizontal direction of the frame 230 extend in a longitudinal direction of the frame 230, and both side faces in a vertical direction of the frame 230 extend in a short direction of the frame 230. Further, for example, both side faces in a horizontal direction of the front panel 220 extend in a longitudinal direction of the front panel 220, and both side faces in a vertical direction of the front panel 220 extend in a short direction of the front panel 220. Both end parts (a right end part 220R and a left end part 220L) in the horizontal direction of the front panel 220 are supported by portions (side wall parts), of the housing 210, that structure the side faces 210R and 210L.

The housing 210 includes, for example, a metal, a polymer resin, or a wood. Examples of the metal used for the housing 210 include a single substance such as aluminum, titanium, zinc, nickel, magnesium, copper, or iron, and an alloy containing two or more of these metals. Concrete examples of the alloy used for the housing 210 include a stainless steel (SUS), an aluminum alloy, a magnesium alloy, and a titanium alloy. Examples of the polymer resin used for the housing 210 include a copolymerized synthetic resin (an ABS resin) of acrylonitrile, butadiene, and styrene, a polycarbonate (PC) resin, and a PC-ABS alloy resin.

The front panel 220 includes, for example, a front glass plate 221 structuring a picture displaying surface of the electronic apparatus 200, and a display panel 222 that is in contact with a back face of the front glass plate 221. The display panel 222 corresponds to a concrete example of the "functional unit" of the present disclosure. The front glass plate 121 protects the display panel 222 from an impact from outside, and is configured by, for example, a tempered glass plate. The display panel 222 displays a picture under the control of a later-described controller 252, and includes, for example, an organic EL panel or a liquid crystal panel. The display panel 222 further includes a touch sensor that generates a touch signal that is based on a touch operation performed on the picture displaying surface of the electronic apparatus 200, for example. The touch sensor is, for example, of a capacitive type.

The electronic apparatus 200 further includes two pressure-sensitive sensors 240, a mounting substrate 250, and a battery 260. The pressure-sensitive sensor 240 corresponds to a concrete example of the "sensor device" of the present disclosure. The mounting substrate 250 corresponds to a concrete example of the "signal processor" of the present disclosure. A module including the pressure-sensitive sensor 240 and the mounting substrate 250 corresponds to a concrete example of the "input device" of the present disclosure. The two pressure-sensitive sensors 240, the mounting substrate 250, and the battery 260 are contained in a housing 210, for example, in a space surrounded by the front panel 220 and the housing 210. One of the pressure-sensitive sensors 240 is attached to an inner side face 211R of the housing 210. The inner side face 211R is an inner face that faces the side face 210R of a side wall of the housing 210. The other of the pressure-sensitive sensors 240 is attached to an inner side face 211L of the housing 210. The inner side face 211L is an inner face that faces the side face 210L of the side wall of the housing 210. In each of the pressure-sensitive sensors 240, a face that is on an opposite side of a face attached to the housing 210 faces a void G3 inside the electronic apparatus 200, and is not in contact with the mounting substrate 250 or the battery 260. That is, the voids G3 are present between the mounting substrate 250 as well as the battery 260 and the respective pressure-sensitive sensors 240. That is, the respective pressure-sensitive sensors 240 are only attached to the inner side faces 211R and 211L and are not sandwiched in the vertical direction by the front panel 220 and the mounting substrate 250 as well as the battery 260. Further, each of the pressure-sensitive sensors 240 has a thickness that allows the void G3 in the electronic apparatus 200 to compensate for a tolerance of each component in the electronic apparatus 200. That is, the pressure-sensitive sensors 240 each have a thickness that does not influence the tolerance of each component in the electronic apparatus 200.

The battery 260 supplies electric power to the mounting substrate 250. The battery 260 includes, for example, a secondary battery and a charge-discharge control circuit that controls charge and discharge of the secondary battery. The mounting substrate 250 is configured by a printed wiring substrate and various chips, modular components, etc., that are mounted on the printed wiring substrate. For example, as illustrated in FIG. 22, CPU 251, controllers 252 and 253, a camera 254, a wireless communicator 255, an antenna 256, a sound processor 257, a speaker 258, a microphone 259, and the like are mounted on the printed wiring substrate.

The CPU 251 controls various components in the electronic apparatus 200. The CPU 251 controls, for example, the camera 254, the wireless communicator 255, the sound processor 257, and the battery 260. The CPU 251 further controls, via the controller 252, picture displaying to be performed on the display panel 222, for example. The CPU 251 further controls each of the pressure-sensitive sensors 240 via the controller 253 and acquires the detection signal Sig generated by each of the pressure-sensitive sensors 240 via the controller 253, for example. The CPU 251 further controls various components (functional units having predetermined functions) in the electronic apparatus 200, on the basis of the detection signal Sig obtained via the controller 253, for example.

For example, in a case where a location of pressing the side face 210R or the side face 210L of the housing 210 is detected on the basis of the detection signal Sig as being varied in a longitudinal direction of the side face 210R or the side face 210L, the CPU 251 outputs, to a predetermined component (a functional unit having a predetermined function) in the electronic apparatus 200, a predetermined command that is based on an amount of variation and a direction of variation in the pressing location.

The controller 252 controls the picture displaying to be performed on the display panel 222, in accordance with the control of the CPU 251. The controller 253 controls the pressure-sensitive sensor 240, processes the detection signal Sig generated by the pressure-sensitive sensor 240, and outputs the processed detection signal Sig to the CPU 251, in accordance with the control of the CPU 251. The camera 254 includes, for example, a CCD image sensor, a CMOS image sensor, or the like. The camera 254 performs imaging and outputs image data obtained by the imaging to the CPU 251, in accordance with the control of the CPU 251.

The wireless communicator 255 performs a wireless communication with a base station of a mobile telephone via an antenna 256, for example. The wireless communicator 255 includes, for example, a baseband unit, an RF (Radio Frequency) front-end unit, and the like. The sound processor 257 generates a sound signal, outputs the generated sound signal to the speaker 258, and outputs a sound signal inputted from the microphone 259 to the CPU 251, in accordance with the control of the CPU 251. The CPU 251 controls various components (the functional units having the predetermined functions) in the electronic apparatus 200, on the basis of the sound signal inputted from the sound processor 257.

Next, a configuration of the pressure-sensitive sensor 240 will be described in detail.

FIG. 23 illustrates an upper surface configuration example of the pressure-sensitive sensor 240. FIG. 24 illustrates an upper surface configuration example when later-described bumps 241 and a later-described reference electrode layer 242 are removed from the pressure-sensitive sensor 240. FIG. 25 illustrates an upper surface configuration example when later-described bumps 243 and a part of later-described FPC 244 are removed from the pressure-sensitive sensor 240. FIG. 26 illustrates a lower surface configuration example of the pressure-sensitive sensor 240. FIG. 27 illustrates a cross-sectional configuration example of a portion, of the pressure-sensitive sensor 240, corresponding to the line A-A of FIG. 23.

The pressure-sensitive sensor 240 has, for example, the plurality of bumps 241, the reference electrode layer 242, the plurality of bumps 243, the FPC 244, an adhesion layer 246, and a reference electrode layer 247 in this order from the front panel 220 side. The FPC 244 is provided with a plurality of detection electrode sections 245 of a capacitive type. In the pressure-sensitive sensor 240, the plurality of bumps 241 and the plurality of bumps 243 provided above and below the reference electrode layer 242 function as a pressing transmission layer 248 that causes locations, of the reference electrode layer 242, that face the respective detection electrode sections 245 to be deformed locally in response to pressing from the front panel 220.

The respective bumps 241 are provided at locations, of the reference electrode layer 242, that are on an opposite side of the respective bumps 243 and that face the respective detection electrode sections 245. The respective bumps 243 are provided in a layer between the FPC 244 and the reference electrode layer 242 and provided around locations that face the respective detection electrode sections 245. The respective bumps 243 form voids G4 at the locations that face the respective detection electrode sections 245. A height of each of the bumps 243 is lower than a height of each of the bumps 243. The bumps 241 and 243 are each configured by, for example, a two-sided adhesive sheet in which adhesion layers are provided on both sides of a resin film.

The plurality of bumps 241 is regularly disposed via a predetermined gap on a face, of the reference electrode layer 242, that is on an opposite side of the respective bumps 243. The plurality of bumps 241 is disposed in a line in the longitudinal direction of the side faces 210R and 210L, for example. The bumps 241 each have, for example, a rectangular planar configuration extending in the longitudinal direction of the side faces 210R and 210L.

The plurality of bumps 243 is regularly disposed, via predetermined gaps (the voids G4), on a face, of the reference electrode layer 242, that is on the FPC 244 side. At both end parts on the right and the left sides of the FPC 244, the plurality of bumps 243 (243a) is disposed in a line in the longitudinal direction of the both side faces (the side faces 210R and 210L) in the horizontal direction of the housing 210, for example.

In a region between two 243a that face each other in the longitudinal direction of the FPC 244, the plurality of bumps 243 (243b) extends, for example, from a left end part to a right end part of the FPC 244. The bumps 243b each have, for example, a quadrate planar configuration extending in the short direction of the FPC 244. In each of a location that faces an upper end part of the FPC 244 and a location that faces a lower end part of the FPC 244, the bumps 243 (243c) extend, for example, from the left end part to the right end part of the FPC 244. The bumps 243c each have, for example, a quadrate planar configuration extending in the short direction of the FPC 244.

The reference electrode layer 242 is provided at a location, of the FPC 244, that faces a location other than a terminal 244A (described later) of the FPC 244, and has a sheet-like shape. The reference electrode layer 242 has a rigidity lower than that of the FPC 244, and is configured by a metal thin film or an electrically conductive fiber. Examples of the metal thin film include a SUS-sheet. Examples of the electrically conductive fiber include a conductive cloth and a conductive woven fabric cloth. The reference electrode layer 242 is a so-called grounding electrode, and has a ground potential.

The reference electrode layer 242 may be configured by, for example, an inorganic electrically conductive layer containing an inorganic-based electrically conductive material, an organic electrically conductive layer containing an organic-based electrically conductive material, and an inorganic-organic electrically conductive layer containing both the inorganic-based electrically conductive material and the organic-based electrically conductive material. The inorganic-based electrically conductive material and the organic-based electrically conductive material may be particulates. As the inorganic-based electrically conductive material and the organic-based electrically conductive material, it is possible to use materials similar to the inorganic-based electrically conductive material and the organic-based electrically conductive material used for the reference electrode layer 142. The FPC 244 has a higher rigidity than the reference electrode layer 242, and supports the respective detection electrode sections 245. The FPC 244 is configured by a resin substrate having flexibility. Examples of a material of the resin substrate used for the FPC 244 include the material used for the FPC 144.

In the FPC 244, the plurality of detection electrode sections 245 is regularly disposed via predetermined gaps. The plurality of detection electrode sections 245 is disposed, for example, side by side in an extending direction of the inner side faces 211R and 211L of the housing 210. The detection electrode sections 245 each have, for example, a rectangular planar configuration extending in the extending direction of the inner side faces 211R and 211L of the housing 210. The detection electrode sections 245 are each configured to be capable of forming a capacitive coupling. The detection electrode sections 245 are each configured by, for example, as illustrated in FIG. 28, a comb teeth shaped first electrode part 245A and a comb teeth shaped second electrode part 245B that face each other in a plane parallel to the reference electrode layer 242, and each detect a capacitance corresponding to a distance with respect to the reference electrode layer 242.

The FPC 244 further includes a terminal 244A, a wiring line 249A, a plurality of wiring lines 249B, and a wiring line 249C. The terminal 244A is coupled to a connector provided at the printed wiring substrate of the mounting substrate 250. One end of each of the wiring line 249A, the plurality of wiring lines 249B, and the wiring line 249C is disposed at the terminal 244A. The wiring line 249A is coupled to each of the detection electrode sections 245. The wiring line 249A is coupled to the first electrode part 245A of each of the detection electrode sections 245. The plurality of wiring lines 249B is assigned one by one for each of the detection electrode sections 145. The wiring lines 249B are each coupled to the second electrode part 245B of the detection electrode section 245. The wiring line 249C is coupled to the reference electrode layers 242 and 247.

The reference electrode layer 247 is attached to the FPC 244 via the adhesion layer 246. The adhesion layer 246 is configured by, for example, a two-sided adhesive sheet in which adhesion layers are provided on both sides of a resin film. The reference electrode layer 247 is provided at a location, of the FPC 244, that faces a location other than the terminal 244A of the FPC 244, and has a sheet-like shape. The reference electrode layer 242 is configured by, for example, an electromagnetic shielding film in which a metal thin film and a resin layer are laminated. As a material of the reference electrode layer 247, it is possible to use a material used as the reference electrode layer 242. The reference electrode layer 247 is a so-called grounding electrode, and has a ground potential.

The reference electrode layers 242 and 247 are so disposed as to sandwich the plurality of detection electrode sections 245 as described above. Accordingly, the reference electrode layers 242 and 247 each have a function of suppressing an external noise (an external electric field) from entering each of the detection electrode sections 245.

Next, a pressing detection performed in the pressure-sensitive sensor 240 will be described.

First, the CPU 251 controls the pressure-sensitive sensor 240 via the controller 253. At this time, the controller 253 sequentially drives, via the plurality of wiring lines 249A and 249B, the plurality of detection electrode sections 245 provided in the pressure-sensitive sensor 240. The controller 253 acquires, by the sequential driving, the detection signal Sig generated by each of the detection electrode sections 245, and outputs the acquired detection signals Sig to the CPU 251. The CPU 251 performs the control corresponding to a pressed position, on the basis of the inputted detection signal Sig of each of the detection electrode sections 245.

For example, as illustrated in FIG. 29, it is assumed that the side face 210R or the side face 210L of the housing 210 is pressed by a user. At this time, the side face 210R or the side face 210L of the housing 210 is slightly curved by the pressing performed by the user. The curving of the side face 210R or the side face 210L of the housing 210 depresses one or the plurality of bumps 241 of the pressing transmission layer 248, and the depressed one or plurality of bumps 241 depresses the reference electrode layer 242. At this time, the plurality of bumps 243 positioned below the reference electrode layer 242 supports portions, of the reference electrode layer 242, that are not opposed to the respective bumps 241. Thus, a portion, of the reference electrode layer 242, that faces the depressed one or plurality of bumps 241 is locally curved. The local curving of the reference electrode layer 242 narrows the void G4 between the detection electrode section 245 and the reference electrode layer 242, allowing the capacitance occurring between the detection electrode section 245 and the reference electrode layer 242 to vary in response to the change in the void G4 (the displacement D). An output V (the detection signal Sig) of the pressure-sensitive sensor 240 varies in response to an amount of variation in the capacitance (the displacement D of the void G4). The output V of the pressure-sensitive sensor 240 varies, for example, as illustrated by the solid line in FIG. 12. At this time, a slope ($\Delta V/\Delta D$) of the output V of the pressure-sensitive sensor 240 varies, for example, as illustrated by the solid line in FIG. 13.

Ideally, the output V of the pressure-sensitive sensor 240 varies linearly at a predetermined area $\alpha$ of the displacement D, as illustrated by the dashed line in FIG. 12. Further, ideally, the slope ($\Delta V/\Delta D$) of the output V of the pressure-sensitive sensor 240 has a constant value at the predetermined area $\alpha$ of the displacement D, as illustrated by the dashed line in FIG. 13. In a case where the output V and the slope ($\Delta V/\Delta D$) of the output V of the pressure-sensitive sensor 240 are ideally set, an operation load is 1 when the displacement D at the time of mounting is within the predetermined area $\alpha$ due to a tolerance of the side face 210R or the side face 210L of the housing 210. In a case where the operation load is 1, pressing force of the side face 210R or the side face 210L of the housing 210 necessary for the user to turn on an application is constant regardless of a location, and an operation feeling to be felt by the user is constant regardless of the location. Further, in this case, a size of the area $\alpha$ becomes a tolerance compensation width of the pressure-sensitive sensor 240, which is larger than the tolerance of the side face 210R or the side face 210L of the housing 210.

Actually, the output V of the pressure-sensitive sensor 240 is nonlinear, for example, as illustrated by the solid line in FIG. 12, and the slope ($\Delta V/\Delta D$) of the output V of the pressure-sensitive sensor 240 has a peak, as illustrated by the solid line in FIG. 13. In this case, when there is a location (a location A) at which the displacement D at the time of mounting is 112 μm at the maximum due to the tolerance of the side face 210R or the side face 210L of the housing 210, the slope ($\Delta V/\Delta D$) of the output V of the pressure-sensitive sensor 240 at the location A has a value that is half the value (e.g., 45 [/μm]) of a peak value (e.g., 90 [/μm]). At this time, the operation load is 90/45=2. Further, when there is a location (a location B) at which the displacement D at the time of mounting is 90 µm due to the tolerance of the housing 210, the slope (ΔV/ΔD) of the output V of the pressure-sensitive sensor 240 at the location B has a value that is ¼ (e.g., 22.5 [/µm]) of a peak value (e.g., 90 [/µm]). At this time, the operation load is 90/22.5=4.

The operation load at the location where the displacement D is 112 µm is two times the operation load at the location where the displacement D is 122 µm. In this case, in order to achieve the same variation in the sensor output value, the user feels two times the difference for the operation load. Further, the operation load at the location where the displacement D is 90 µm is four times the operation load at the location where the displacement D is 122 µm. In this case, in order to achieve the same variation in the sensor output value, the user feels four times the difference for the operation load. If the operation load differs too much from the displacement to the displacement, the user can feel a sense of discomfort. Accordingly, a ratio between a maximum value Max of the operation load and a minimum value Min of the operation load (Max/Min) is defined. In order for the user not to feel a sense of discomfort for the operation load, it is preferable that Max/Min be as small as possible, preferably 2.5 or less, more preferably 2.0 or less, and ideally 1.5 or less.

Note that the minimum value Min of the operation load is a value corresponding to the maximum value among the values of the slope (ΔV/ΔD) of the sensor output value. This is because the operation load is inversely proportional to the value of the slope (ΔV/ΔD) of the output V. The maximum value Max of the operation load is a value corresponding to a value that is ½ of the maximum value among the values of the slope (ΔV/ΔD) of the output V. If an SN ratio is about 10/µm (the SN ratio>about 25/2.5 µm), it is possible for the controller 253 to differentiate the sensor output from a noise sufficiently. Accordingly, the pressure-sensitive sensor 240 preferably has a sensitivity that allows the controller 253 to detect the sensor output when a location to which the pressure-sensitive sensor 240 is attached (e.g., the housing 210) is deformed by 2.5 µm.

[Effects]

Next, effects of the electronic apparatus 200 according to the present embodiment will be described.

It is conceivable to detect a displacement of a housing of an electronic apparatus by means of a pressure-sensitive sensor, by attaching the pressure-sensitive sensor to a back face of the housing of the electronic apparatus. However, the housing of the electronic apparatus generally has a higher rigidity. Accordingly, it is necessary for the pressure-sensitive sensor to detect a small displacement of the housing of the electronic apparatus.

In the present embodiment, the pressing transmission layer 248 is provided that causes the locations, of the reference electrode layer 242, that face the respective detection electrode sections 245 to be deformed locally in response to the pressing performed from the outside. Thus, a minute displacement resulting from the pressing performed from the outside is transmitted to the reference electrode layer 242 via the pressing transmission layer 248, thereby locally deforming the locations, of the reference electrode layer 242, that face the respective detection electrode sections 245. The local deformation of the reference electrode layer 242 changes the capacitance generated between the reference electrode layer 242 and the detection electrode sections 245, and the change in the capacitance is detected by the detection electrode sections 245. Accordingly, in the present embodiment, the minute displacement resulting from the pressing performed from the outside is converted by the pressing transmission layer 248 into the local displacement of the reference electrode layer 242. Hence, even in a case where the displacement resulting from the pressing performed from the outside is minute, it is possible to detect the displacement.

Further, in the present embodiment, the FPC 244 that supports each of the detection electrode sections 245 has a higher rigidity than the reference electrode layer 242. In other words, the reference electrode layer 242 is softer than the FPC 244. The reference electrode layer 242 is configured by, for example, the metal thin film or the electrically conductive fiber. Thus, a minute displacement resulting from the pressing performed from the outside is transmitted to the reference electrode layer 242 via the pressing transmission layer 248, thereby locally deforming the locations, of the reference electrode layer 242, that face the respective detection electrode sections 245. Hence, even in a case where the displacement resulting from the pressing performed from the outside is minute, it is possible to detect the displacement.

Further, in the present embodiment, the detection electrode sections 245 are each configured by the comb teeth shaped first electrode part 245A and the comb teeth shaped second electrode part 245B that face each other in a plane parallel to the reference electrode layer 242, and each detect the capacitance corresponding to a distance with respect to the reference electrode layer 242. Thus, for example, a leakage of an electric field becomes large and the variation in the capacitance corresponding to the distance with respect to the reference electrode layer 242 becomes large as compared with a case where the first electrode part 245A and the second electrode part 245B are so disposed as to face each other in a thickness direction. Hence, even in a case where the displacement resulting from the pressing performed from the outside is minute, it is possible to detect the displacement.

Further, in the present embodiment, the plurality of bumps 241 and the plurality of bumps 243 are provided above and below the reference electrode layer 242. Thus, it is possible to transmit, to the reference electrode layer 242, the displacement resulting from the pressing performed from the outside, as compared with a case where the plurality of bumps 243 is provided only below the reference electrode layer 242. Hence, even in a case where the displacement resulting from the pressing performed from the outside is minute, it is possible to detect the displacement.

Further, in the present embodiment, the height of each of the bumps 243 is lower than the height of each of the bumps 241. Thus, it is possible to detect the local displacement of the reference electrode layer 242 effectively as compared with a case where the height of each of the bumps 243 is higher than the height of each of the bumps 241. Hence, even in a case where the displacement resulting from the pressing performed from the outside is minute, it is possible to detect the displacement.

Further, in the present embodiment, the respective bumps 241 and the respective bumps 243 are both configured by the two-sided adhesive sheet in which the adhesion layers are provided on both sides of the resin film. Hence, it is possible to generate the local displacement of the reference electrode layer 242 effectively without damaging the reference electrode layer 242.

Further, in the present embodiment, a face, of the pressure-sensitive sensor 240, that is on a side of the pressing transmission layer 148 is attached to the inner side face 211R or 211L of the housing 210. Furthermore, a face, of the pressure-sensitive sensor 140, that is on an opposite side of the pressing transmission layer 148 faces the void G3 inside the electronic apparatus 100. That is, the pressure-sensitive sensor 140 is only attached to the inner side face 211R or 211L of the housing 210 and is not sandwiched by the housing 210 and the frame 230. Accordingly, for the pressure-sensitive sensor 240, it is only necessary to take into consideration the deformation caused by the tolerance of the inner side faces 211R and 211L of the housing 210, and it is not necessary to take into consideration the deformation caused by a tolerance of the frame 230. Hence, it is possible to reduce the degree of difficulty in designing the pressure-sensitive sensor 240.

Further, in the present embodiment, the plurality of detection electrode sections 245 is disposed side by side in the extending direction of the inner side faces 211R and 211L of the housing 210. Hence, for example, in a case where the user has varied a location of pressing along the inner side face 211R or 211L of the housing 210, it is possible for the CPU 251 to output, to a predetermined component (the functional unit having the predetermined function) in the electronic apparatus 100, a command that is based on an amount of variation and a direction of variation in the pressing location.

4. Modification Examples

Next, modification examples of the pressure-sensitive sensor 240 according to the above second embodiment will be described.

Modification Example D

FIG. 30 illustrates a modification example of a cross-sectional configuration of the pressure-sensitive sensor 240. In the pressure-sensitive sensor 240 according to the above second embodiment, the bumps 241 each may include, for example, a porous layer 241B. The bumps 241 are each a stacked body in which, for example, adhesion layers 241A and 241C are provided on both sides of the porous layer 241B. Examples of the porous layer 241B include a sponge. Even in such a case, it is possible to detect a minute displacement resulting from the pressing performed from the outside as with the above embodiment.

Modification Example E

FIG. 31 illustrates a modification example of a cross-sectional configuration of the pressure-sensitive sensor 240. In the pressure-sensitive sensor 240 according to the above embodiment, a sheet-like elastic layer 249 may be provided instead of the plurality of bumps 241. The elastic layer 249 is provided on a side, of the reference electrode layer 242, that is on an opposite side of the bumps 243, and has a lower rigidity than the FPC 244. The elastic layer 249 may include, for example, a porous layer 249b. The elastic layer 249 is a stacked body in which, for example, adhesion layers 249A and 249C are provided on both sides of the porous layer 249b. Examples of the porous layer 249b include a sponge. In the present modification example, the height of each of the bumps 243 is lower than a thickness of the elastic layer 249.

In the present modification example, when the front panel 220 is slightly curved by the pressing performed by the user, the curving of the front panel 220 depresses the elastic layer 249 of the pressing transmission layer 248, and the depressed elastic layer 249 depresses the reference electrode layer 242. At this time, the plurality of bumps 243 positioned below the reference electrode layer 242 is regularly disposed via the voids G4. Thus, a portion, of the reference electrode layer 242, that faces the void G4 is locally curved. The local curving of the reference electrode layer 242 narrows the void G4 between the detection electrode section 245 and the reference electrode layer 242, allowing the capacitance occurring between the detection electrode section 245 and the reference electrode layer 242 to vary in response to the change in the void G4 (the displacement D). The output V (the detection signal Sig) of the pressure-sensitive sensor 240 varies in response to the amount of variation in the capacitance (the displacement D of the void G4). The output V of the pressure-sensitive sensor 240 varies, for example, as illustrated by the solid line in FIG. 12. At this time, the slope ($\Delta V/\Delta D$) of the output V of the pressure-sensitive sensor 240 varies, for example, as illustrated by the solid line in FIG. 13. Hence, it is possible to detect a minute displacement resulting from the pressing performed from the outside as with the above embodiment.

Further, in the present modification example, the respective bumps 243 are both configured by the two-sided adhesive sheet in which the adhesion layers are provided on both sides of the resin film. Hence, it is possible to generate the local displacement of the reference electrode layer 242 effectively without damaging the reference electrode layer 242.

Further, in the present modification example, the height of each of the bumps 243 is lower than the thickness of the elastic layer 249. Thus, it is possible to detect the local displacement of the reference electrode layer 242 effectively as compared with a case where the height of each of the bumps 243 is higher than the thickness of the elastic layer 249. Hence, even in a case where the displacement resulting from the pressing performed from the outside is minute, it is possible to detect the displacement.

Modification Example F

FIG. 32 illustrates a modification example of a cross-sectional configuration of the pressure-sensitive sensor 240. In the above modification example E, the reference electrode layer 242 may have, at the locations that face the respective detection electrode sections 245 (that is, locations facing the voids G4), curved sections 242A that protrude towards the detection electrode section 245 side. In this case, the void G4 is already displaced by an amount of the protrusion (e.g., 100 μm) of the curved section 242A. Thus, the output V of the pressure-sensitive sensor 240 and the slope ($\Delta V/\Delta D$) of the output V start from values shifted by the amount of the protrusion of the curved section 242A (e.g., 100 μm) as illustrated in FIGS. 17 and 18, for example. As a result, the slope ($\Delta V/\Delta D$) of the output V of the pressure-sensitive sensor 240 reaches the peak value by slight pressing as compared with a case where no curved section 242A is provided. Hence, in the present modification example, it is possible to detect a minute displacement resulting from the pressing performed from the outside with higher accuracy as compared with the above embodiment and its modification examples.

Although the present disclosure has been described above with reference to the embodiments, the present disclosure is not limited to the above embodiments, and various modifications can be made. It should be noted that the effects described in the present specification are mere examples. The effects of the present disclosure are not limited to the effects described in the present specification. The present disclosure may have effects other than those described in the present specification.

For example, the present disclosure may also be configured as follows.

(1)

A sensor device including:
a plurality of detection electrode sections of a capacitive type;
a reference electrode layer disposed at a position that faces each of the detection electrode sections; and
a pressing transmission layer that causes locations, of the reference electrode layer, that face the respective detection electrode sections to be deformed locally in response to pressing performed from outside.

(2)

The sensor device according to (1), further including a flexible substrate that has a higher rigidity than the reference electrode layer and supports each of the detection electrode sections.

(3)

The sensor device according to (1) or (2), in which the reference electrode layer is configured by a metal thin film or an electrically conductive fiber.

(4)

The sensor device according to any one of (1) to (3), in which the detection electrode sections are each configured by a comb teeth shaped first electrode part and a comb teeth shaped second electrode part that face each other in a plane parallel to the reference electrode layer, and each detect a capacitance corresponding to a distance with respect to the reference electrode layer.

(5)

The sensor device according to any one of (1) to (4), in which the pressing transmission layer includes:
first bumps provided in a layer between the flexible substrate and the reference electrode layer and provided around locations that face the respective detection electrode sections, the first bumps forming voids at the locations that face the respective detection electrode sections; and
second bumps provided at locations, of the reference electrode layer, that are on an opposite side of the first bumps and that face the respective detection electrode sections.

(6)

The sensor device according to (5), in which a height of the second bump is lower than a height of the first bump.

(7)

The sensor device according to (5) or (6), in which the first bump and the second bump are both configured by a two-sided adhesive sheet in which adhesion layers are provided on both sides of a resin film.

(8)

The sensor device according to (5) or (6), in which
the first bump is configured by a two-sided adhesive sheet in which adhesion layers are provided on both sides of a resin film, and
the second bump includes a porous layer.

(9)

The sensor device according to (2), in which the pressing transmission layer includes:
bumps provided in a layer between the flexible substrate and the reference electrode layer and provided around locations that face the respective detection electrode sections, the bumps forming voids at the locations that face the respective detection electrode sections; and
an elastic layer provided on a side, of the reference electrode layer, that is on an opposite side of the bumps, and having a lower rigidity than the flexible substrate.

(10)

The sensor device according to (9), in which
the bump is configured by a two-sided adhesive sheet in which adhesion layers are provided on both sides of a resin film, and
the elastic layer includes a porous layer.

(11)

The sensor device according to (9) or (10), in which a height of the bump is lower than a thickness of the elastic layer.

(12)

The sensor device according to any one of (9) to (11), in which the reference electrode layer has, at the locations that face the respective detection electrode sections, curved sections that protrude towards a side of the detection electrode sections.

(13)

An input device including:
a sensor unit that generates a detection signal in response to pressing performed from outside; and
a signal processor that controls the sensor unit, and processes the detection signal generated by the sensor unit, in which
the sensor unit includes
a plurality of detection electrode sections of a capacitive type, the plurality of detection electrode sections generating the detection signal,
a reference electrode layer disposed at a position that faces each of the detection electrode sections, and
a pressing transmission layer that causes locations, of the reference electrode layer, that face the respective detection electrode sections to be deformed locally in response to the pressing.

(14)

An electronic apparatus including:
a functional unit having a predetermined function;
a sensor unit that generates a detection signal in response to pressing performed from outside; and
a signal processor that controls the sensor unit, and controls the functional unit on the basis of the detection signal generated by the sensor unit, in which
the sensor unit includes
a plurality of detection electrode sections of a capacitive type, the plurality of detection electrode sections generating the detection signal,
a reference electrode layer disposed at a position that faces each of the detection electrode sections, and
a pressing transmission layer that causes locations, of the reference electrode layer, that face the respective detection electrode sections to be deformed locally in response to the pressing.

(15)

The electronic apparatus according to (14), in which
the functional unit includes a display panel, and
a face, of the sensor unit, that is on a side of the pressing transmission layer is attached to a back face of the functional unit, and a face, of the sensor unit, that is on an opposite side of the pressing transmission layer faces a void inside the electronic apparatus.

(16)

The electronic apparatus according to (15), in which
the display panel includes a curved panel in which a middle part is flat and an end part is curved, and the plurality of detection electrode sections is disposed side by side along an edge of the display panel at a location that faces a curved part of the display panel.

(17) The electronic apparatus according to (14), further including a housing that contains the functional unit, the sensor unit, and the signal processor, in which
a face, of the sensor unit, that is on a side of the pressing transmission layer is attached to an inner side face of the housing, and a face, of the sensor unit, that is on an opposite side of the pressing transmission layer faces a void inside the electronic apparatus.

(18) The electronic apparatus according to (17), in which the plurality of detection electrode sections is disposed side by side in an extending direction of the inner side face.

In the sensor device, the input device, and the electronic apparatus according to one embodiment of the present disclosure, the minute displacement resulting from the pressing performed from the outside is converted by the pressing transmission layer into the local displacement of the reference electrode layer. Hence, even in a case where the displacement resulting from the pressing performed from the outside is minute, it is possible to detect the displacement. Therefore, it is possible to detect the pressing performed on a surface of the housing or the front panel with a good sensitivity. Note that the effects of the present disclosure are not necessarily limited to the effects described here, and any of the effects described in the present specification may be achieved.

The present application claims the benefit of Japanese Priority Patent Application JP2019-003526 filed with the Japan Patent Office on Jan. 11, 2019, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A sensor device, comprising:
a plurality of detection electrode sections of a capacitive type;
a reference electrode layer at a position that faces each of the plurality of detection electrode sections;
a flexible substrate that supports each of the plurality of detection electrode sections, wherein
the flexible substrate has a rigidity higher than a rigidity of the reference electrode layer; and
a pressing transmission layer configured to deform a first plurality of locations, of the reference electrode layer, that faces the plurality of detection electrode sections, based on a pressing operation from outside.

2. The sensor device according to claim 1, wherein the reference electrode layer comprises a metal thin film or an electrically conductive fiber.

3. The sensor device according to claim 1, wherein
each of the plurality of detection electrode sections comprises a comb teeth shaped first electrode part and a comb teeth shaped second electrode part,
the comb teeth shaped first electrode part faces the comb teeth shaped second electrode part in a plane parallel to the reference electrode layer, and
each of the plurality of detection electrode sections is configured to detect a capacitance corresponding to a distance with respect to the reference electrode layer.

4. The sensor device according to claim 1, wherein
the pressing transmission layer includes:
a plurality of first bumps in a layer between the flexible substrate and the reference electrode layer, wherein
the plurality of first bumps is around a second plurality of locations that faces the plurality of detection electrode sections,
the plurality of first bumps forms a plurality of voids at the second plurality of locations; and
a plurality of second bumps at the first plurality of locations of the reference electrode layer, wherein
the plurality of second bumps is on an opposite side of the plurality of first bumps and faces the plurality of detection electrode sections.

5. The sensor device according to claim 4, wherein a height of the plurality of first bumps is lower than a height of the plurality of second bumps.

6. The sensor device according to claim 5, wherein the plurality of first bumps and the plurality of second bumps are both configured by a two-sided adhesive sheet in which a plurality of adhesion layers is on each side of a resin film.

7. The sensor device according to claim 5, wherein
the plurality of first bumps is configured by a two-sided adhesive sheet in which a plurality of adhesion layers is on each side of a resin film, and
the plurality of second bumps includes a porous layer.

8. The sensor device according to claim 1, wherein
the pressing transmission layer includes:
a plurality of bumps in a layer between the flexible substrate and the reference electrode layer, wherein
the plurality of bumps is around a second plurality of locations that faces the plurality of detection electrode sections,
the plurality of bumps forms a plurality of voids at the second plurality of locations; and
an elastic layer on a side, of the reference electrode layer, that is on an opposite side of the plurality of bumps, wherein
the elastic layer has a rigidity lower than the rigidity of the flexible substrate.

9. The sensor device according to claim 8, wherein
the plurality of bumps is configured by a two-sided adhesive sheet in which a plurality of adhesion layers is on each side of a resin film, and
the elastic layer includes a porous layer.

10. The sensor device according to claim 8, wherein a height of the plurality of bumps is lower than a thickness of the elastic layer.

11. The sensor device according to claim 8, wherein
the reference electrode layer has, at the first plurality of locations, a plurality of curved sections that protrudes toward a side of the plurality of detection electrode sections.

12. An input device, comprising:
a sensor unit configured to generate a detection signal, based on a pressing operation from outside; and
a signal processor configured to:
control the sensor unit; and
process the generated detection signal, wherein the sensor unit includes:
a plurality of detection electrode sections of a capacitive type, wherein the plurality of detection electrode sections is configured to generate the detection signal;
a reference electrode layer at a position that faces each of the plurality of detection electrode sections;

a flexible substrate that supports each of the plurality of detection electrode sections, wherein
the flexible substrate has a rigidity higher than a rigidity of the reference electrode layer; and
a pressing transmission layer configured to deform a plurality of locations, of the reference electrode layer, that faces the plurality of detection electrode sections, based on the pressing operation.

13. An electronic apparatus, comprising:
a functional unit having a specific function;
a sensor unit configured to generate a detection signal, based on a pressing operation from outside; and
a signal processor configured to:
control that controls the sensor unit; and
control the functional unit, based on the generated detection signal, wherein the sensor unit includes:
a plurality of detection electrode sections of a capacitive type, wherein the plurality of detection electrode sections is configured to generate the detection signal;
a reference electrode layer at a position that faces each of the plurality of detection electrode sections;
a flexible substrate that supports each of the plurality of detection electrode sections, wherein
the flexible substrate has a rigidity higher than a rigidity of the reference electrode layer; and
a pressing transmission layer configured to deform a plurality of locations, of the reference electrode layer, that faces the plurality of detection electrode sections, based on the pressing operation.

14. The electronic apparatus according to claim 13, wherein
the functional unit comprises a display panel,
a first face, of the sensor unit, that is on a first side of the pressing transmission layer is attached to a back face of the functional unit, and
a second face, of the sensor unit, that is on a second side opposite to the first side of the pressing transmission layer faces a void inside the electronic apparatus.

15. The electronic apparatus according to claim 14, wherein
the display panel comprises a curved panel in which a middle part is flat and an end part is curved, and
the plurality of detection electrode sections is side by side along an edge of the display panel at a location that faces the curved end part of the display panel.

16. The electronic apparatus according to claim 13, further comprising
a housing that contains the functional unit, the sensor unit, and the signal processor, wherein
a first face, of the sensor unit, that is on a first side of the pressing transmission layer is attached to an inner side face of the housing, and
a second face, of the sensor unit, that is on a second side opposite to the first side of the pressing transmission layer faces a void inside the electronic apparatus.

17. The electronic apparatus according to claim 16, wherein
the plurality of detection electrode sections is side by side in an extending direction of the inner side face.

* * * * *